Sept. 16, 1958  E. A. WILCKENS ET AL  2,851,727
GRANULAR PLASTIC LINING MACHINE
Filed Aug. 11, 1955  16 Sheets-Sheet 1

INVENTORS:
Eibe A. Wilckens,
William C. Rainer,
Edward M. Redding,
BY Cushman, Darby & Cushman
ATTORNEYS.

Sept. 16, 1958 E. A. WILCKENS ET AL 2,851,727
GRANULAR PLASTIC LINING MACHINE
Filed Aug. 11, 1955 16 Sheets-Sheet 2
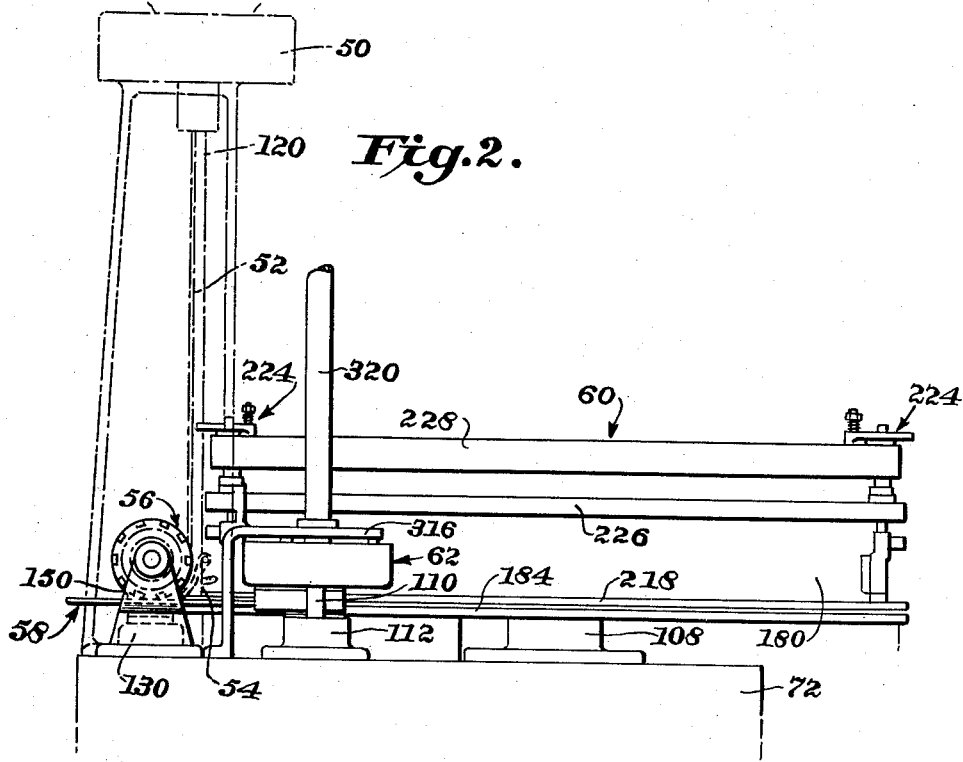
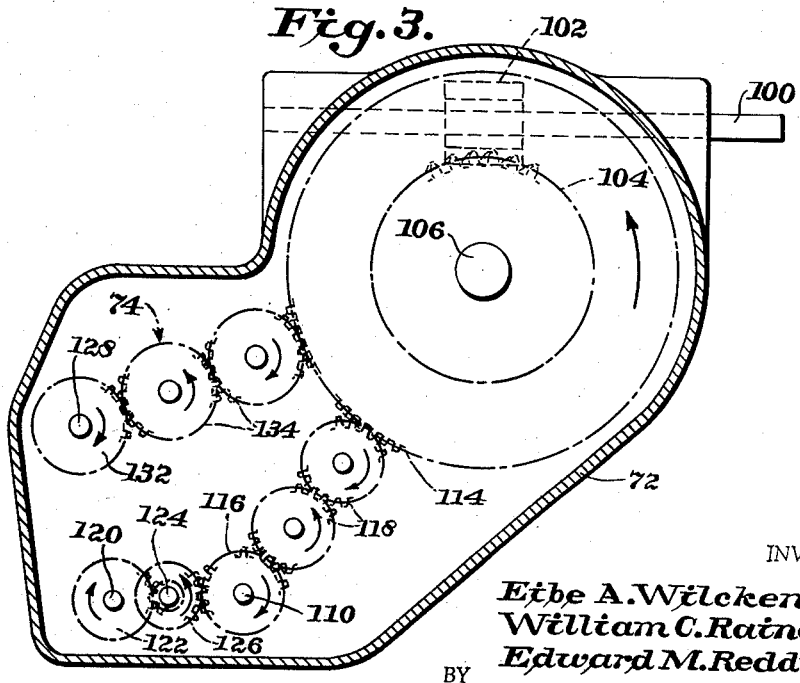
INVENTORS:
Ethe A. Wilckens,
William C. Rainer,
Edward M. Redding,
BY Cushman, Darby & Cushman
ATTORNEYS.

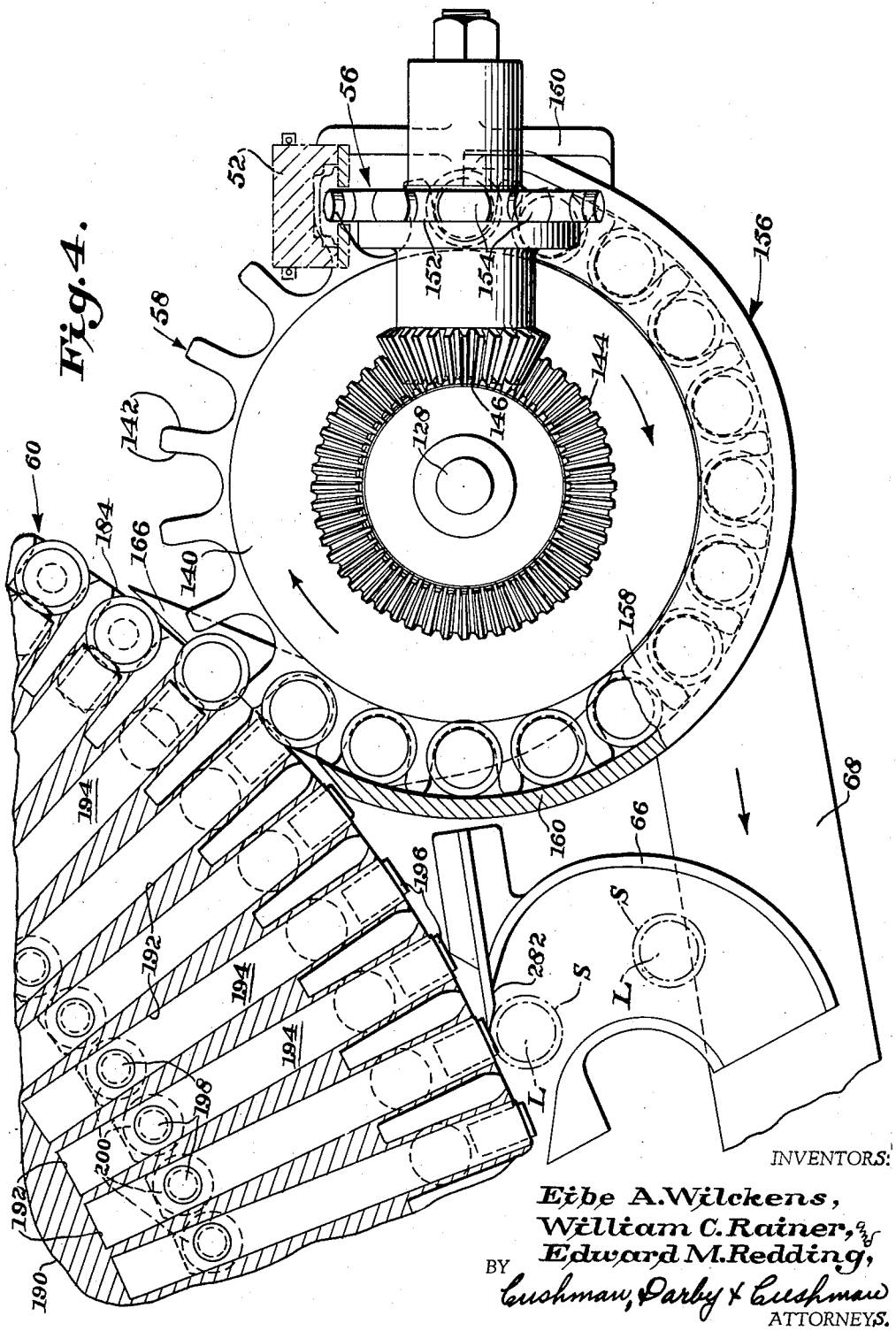

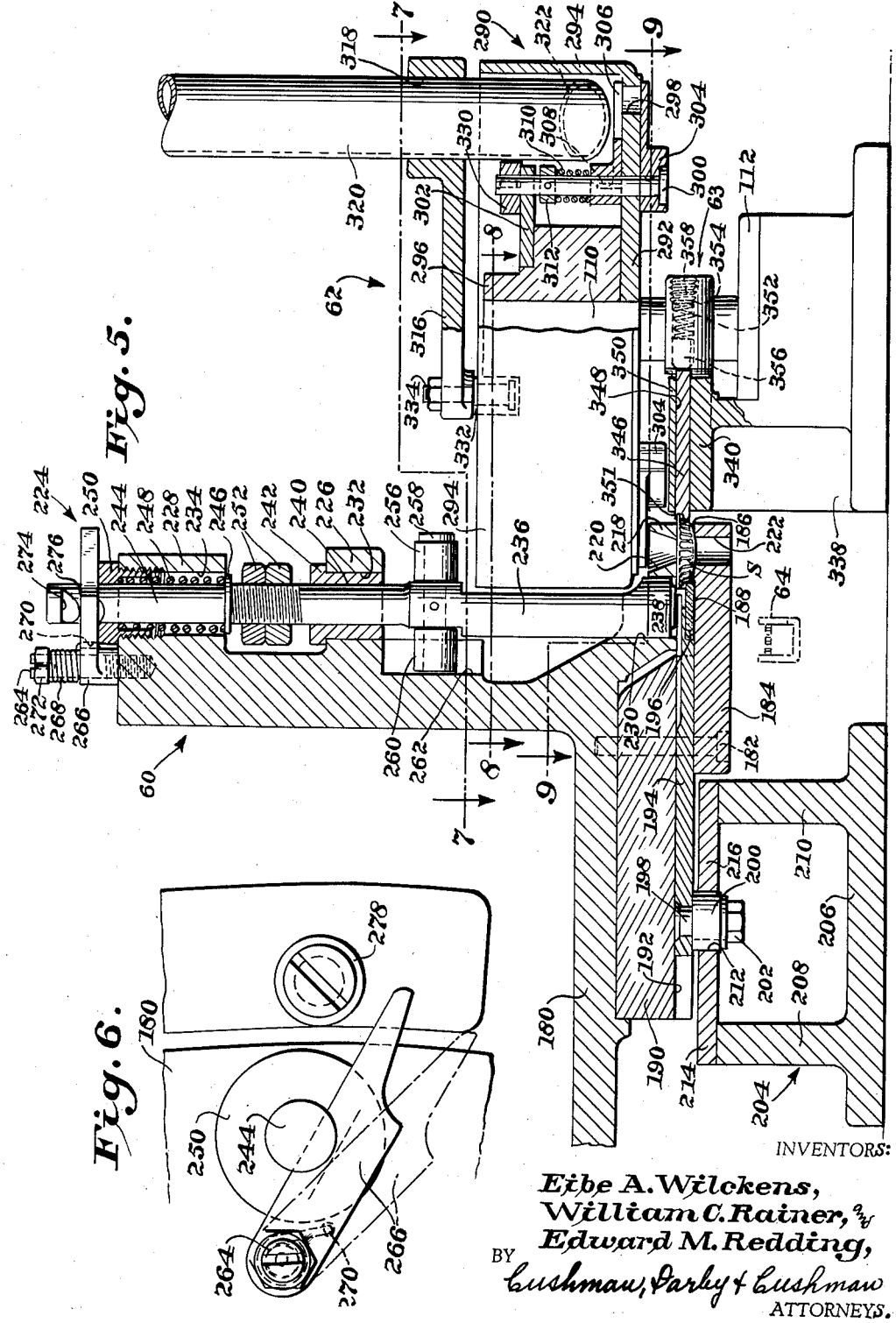

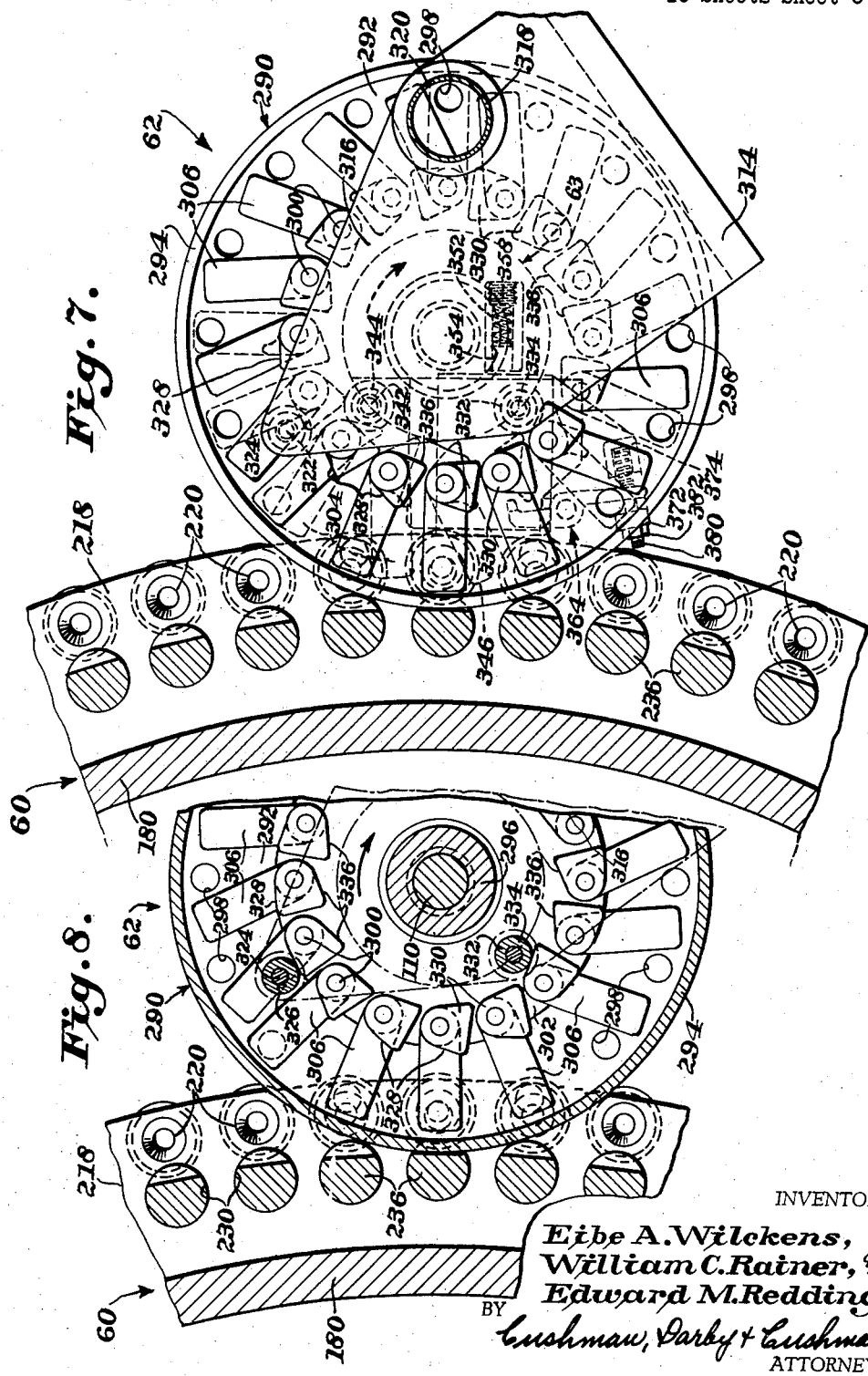

Sept. 16, 1958  E. A. WILCKENS ET AL  2,851,727
GRANULAR PLASTIC LINING MACHINE
Filed Aug. 11, 1955  16 Sheets—Sheet 6
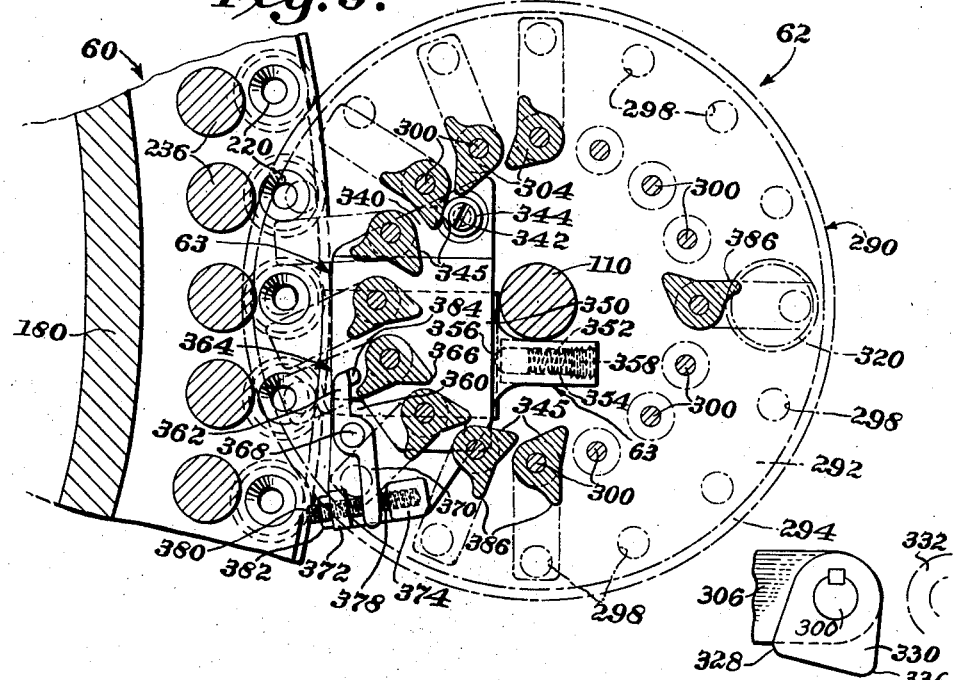
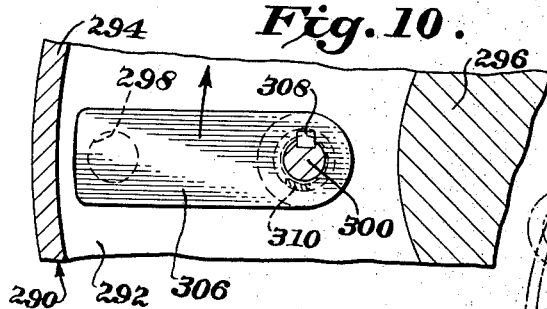
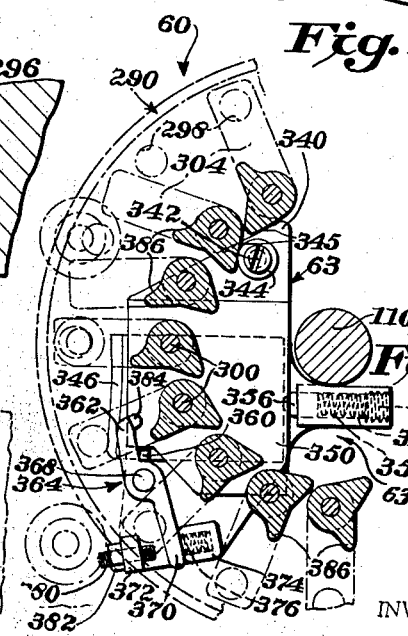
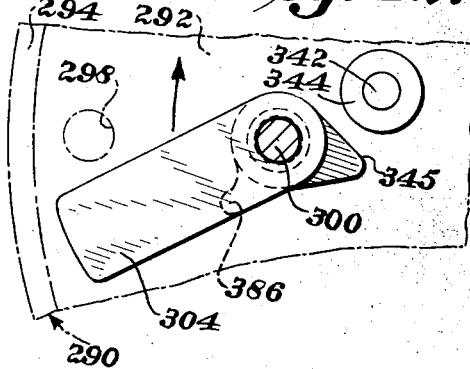
INVENTORS:
Eibe A. Wilckens,
William C. Rainer, &
Edward M. Redding,
BY Cushman, Darby & Cushman
ATTORNEYS.

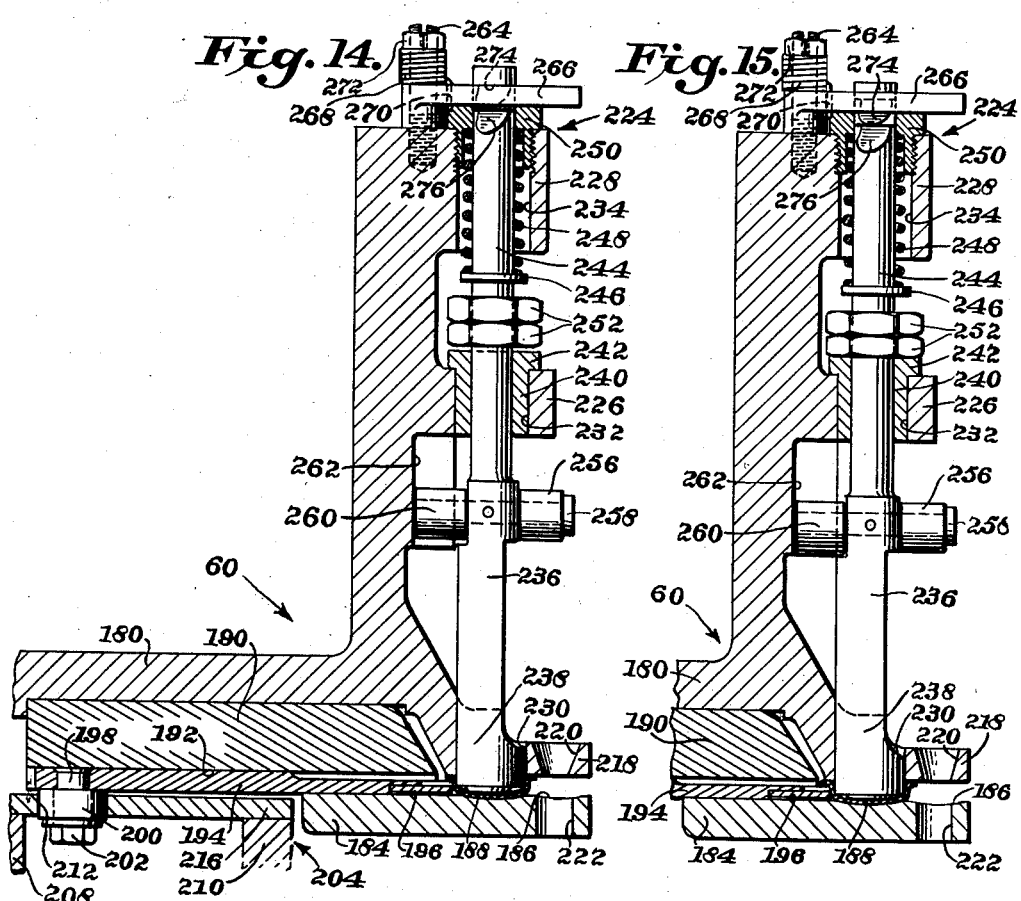

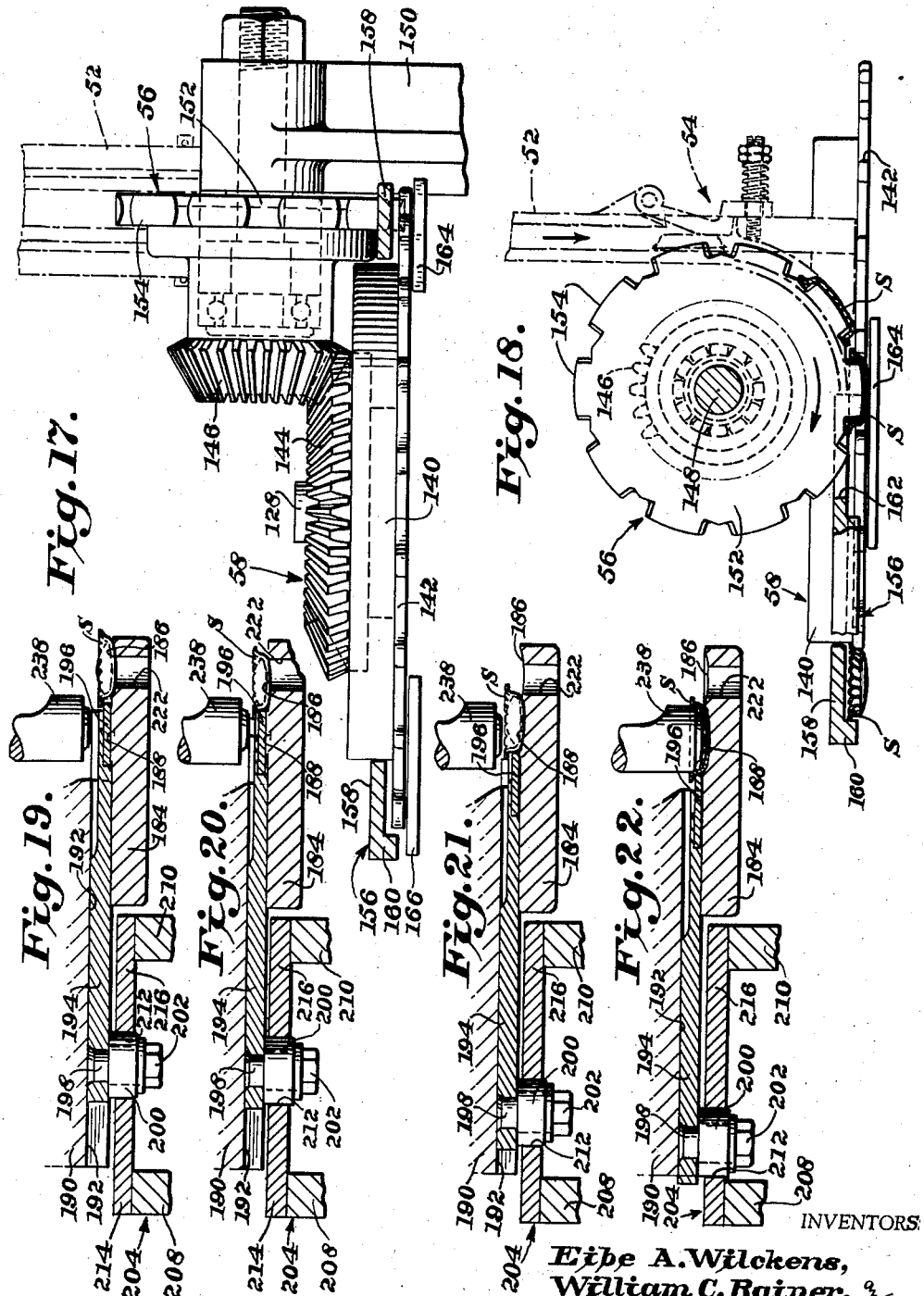

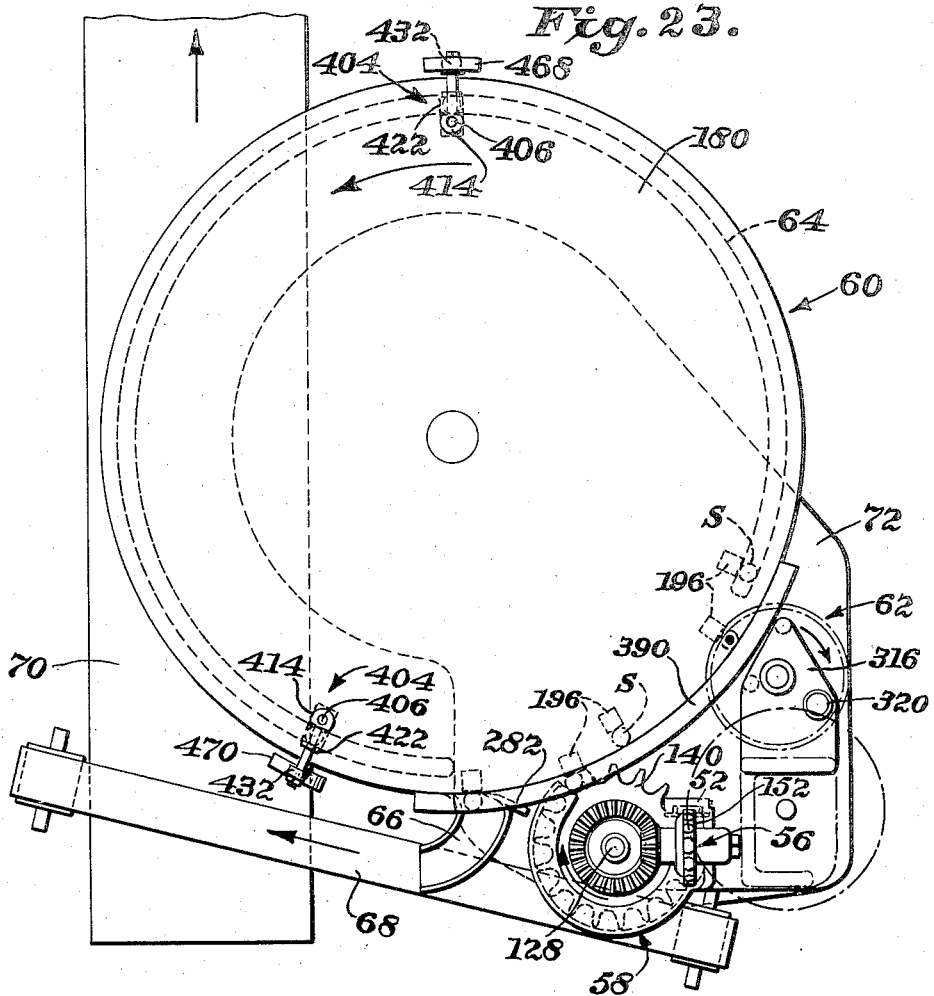

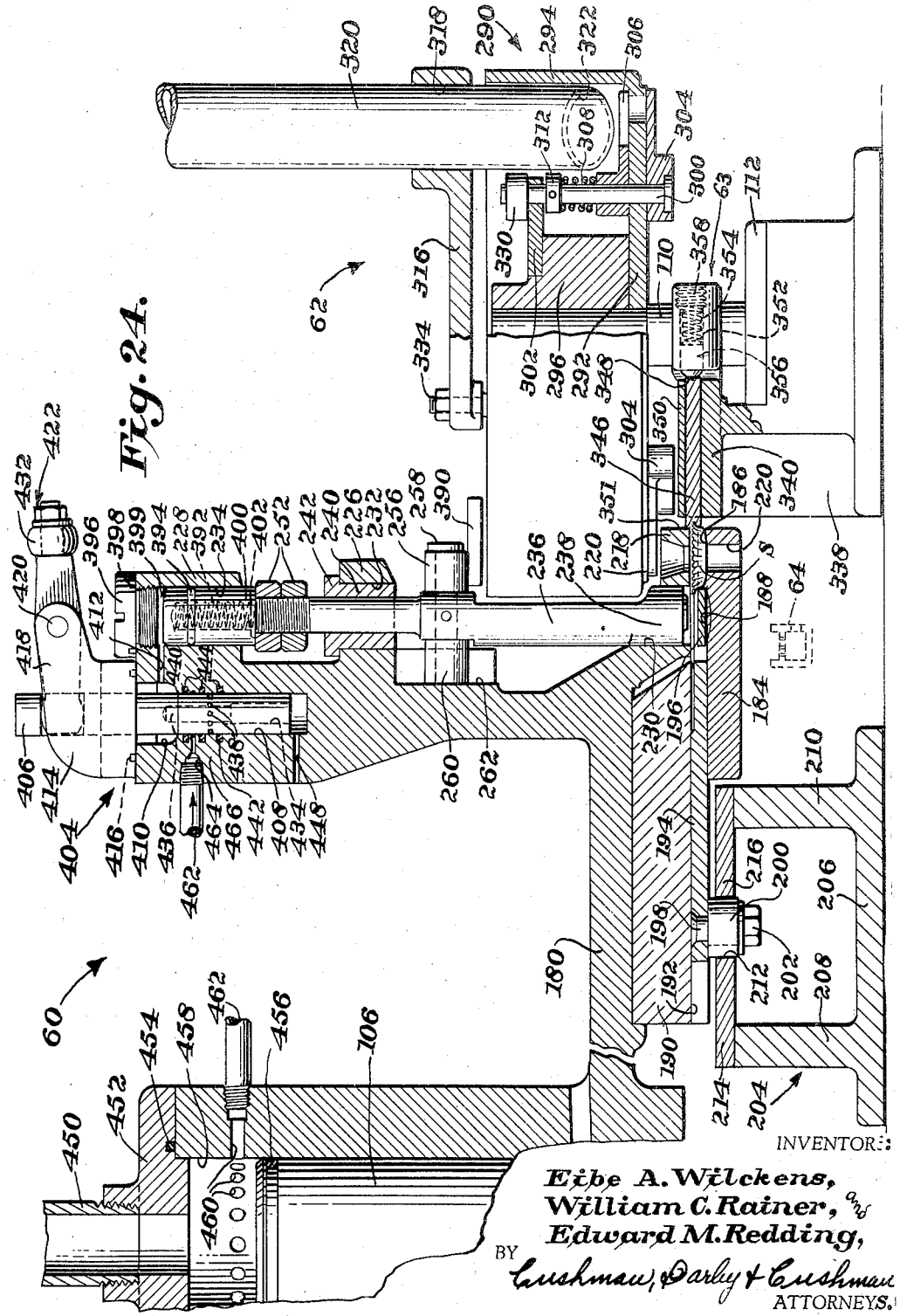

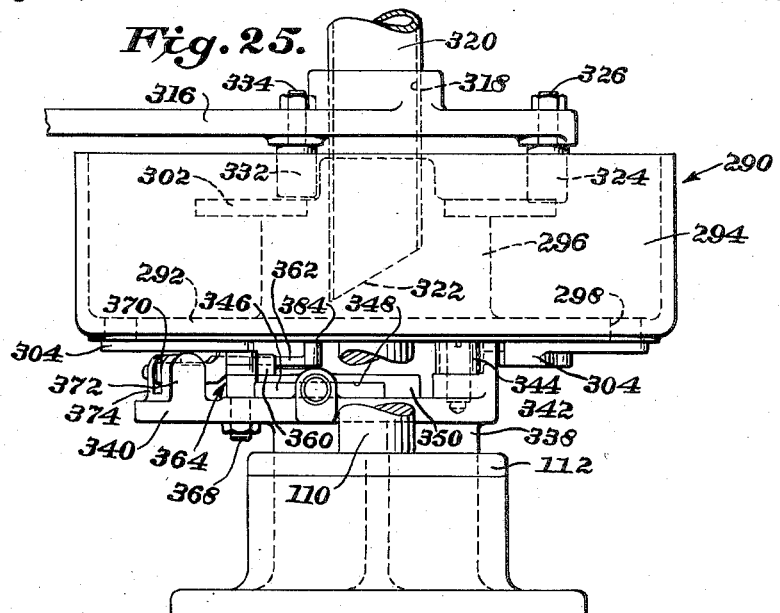
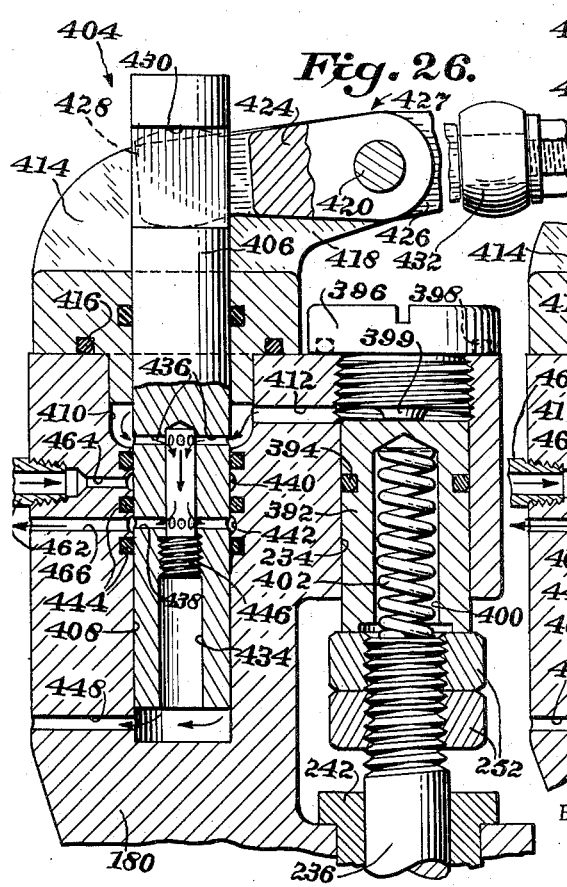
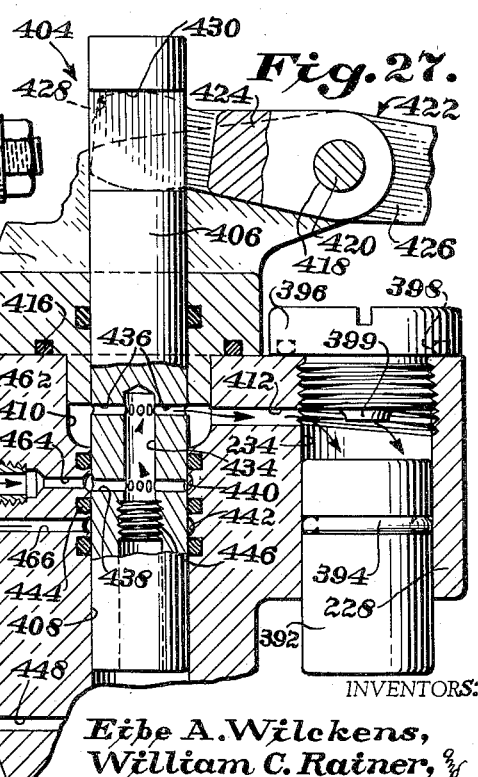

Sept. 16, 1958   E. A. WILCKENS ET AL   2,851,727
GRANULAR PLASTIC LINING MACHINE
Filed Aug. 11, 1955   16 Sheets-Sheet 12

INVENTORS:
Eibe A. Wilckens,
William C. Rainer,
Edward M. Redding,
BY Cushman, Darby & Cushman
ATTORNEYS.

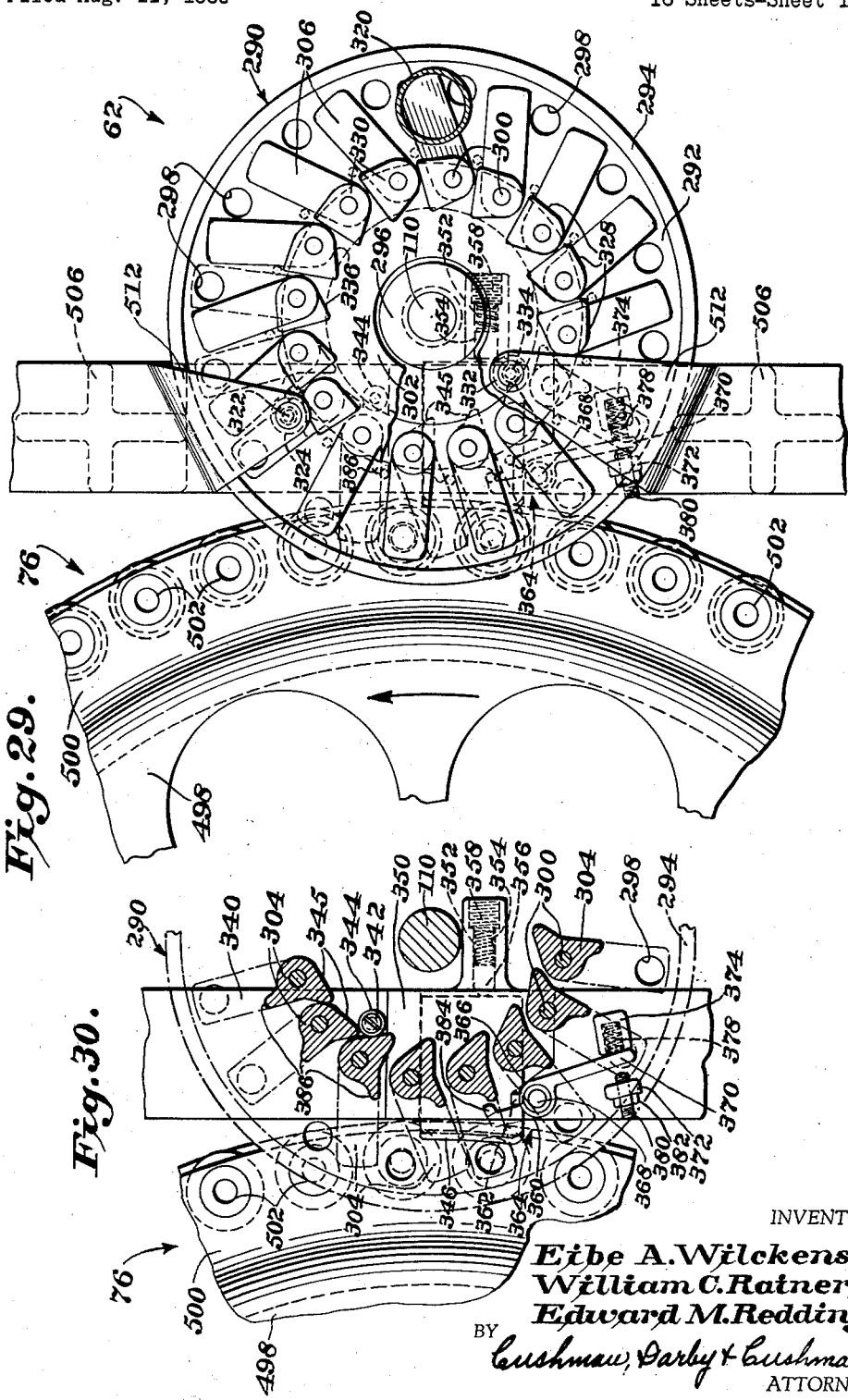

Sept. 16, 1958
E. A. WILCKENS ET AL
2,851,727
GRANULAR PLASTIC LINING MACHINE
Filed Aug. 11, 1955
16 Sheets-Sheet 14
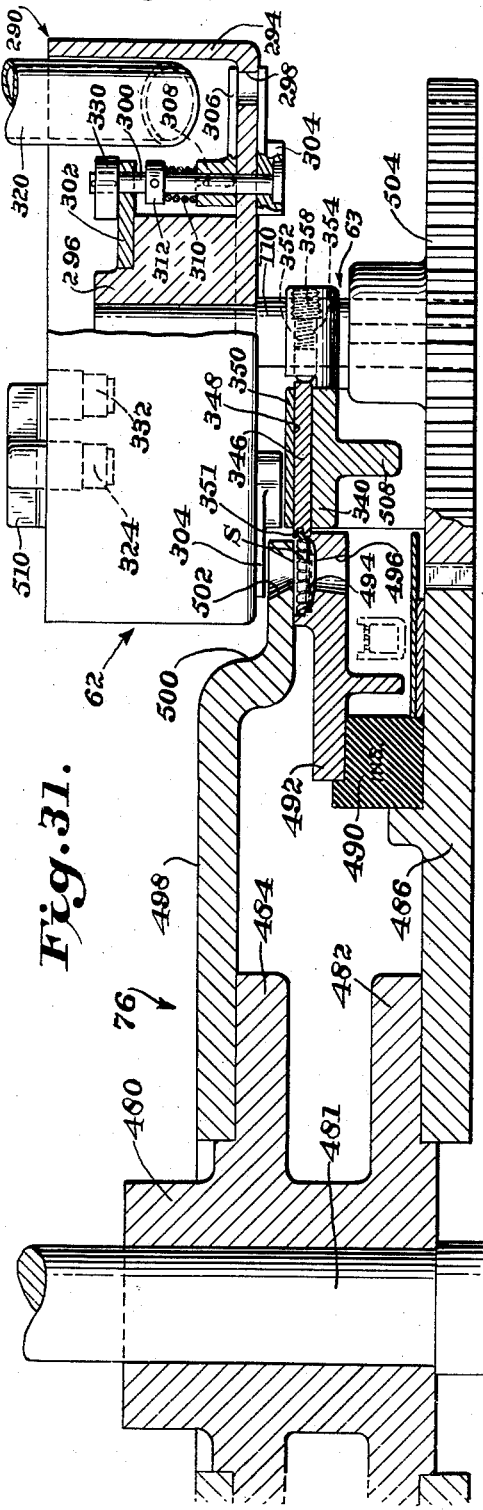
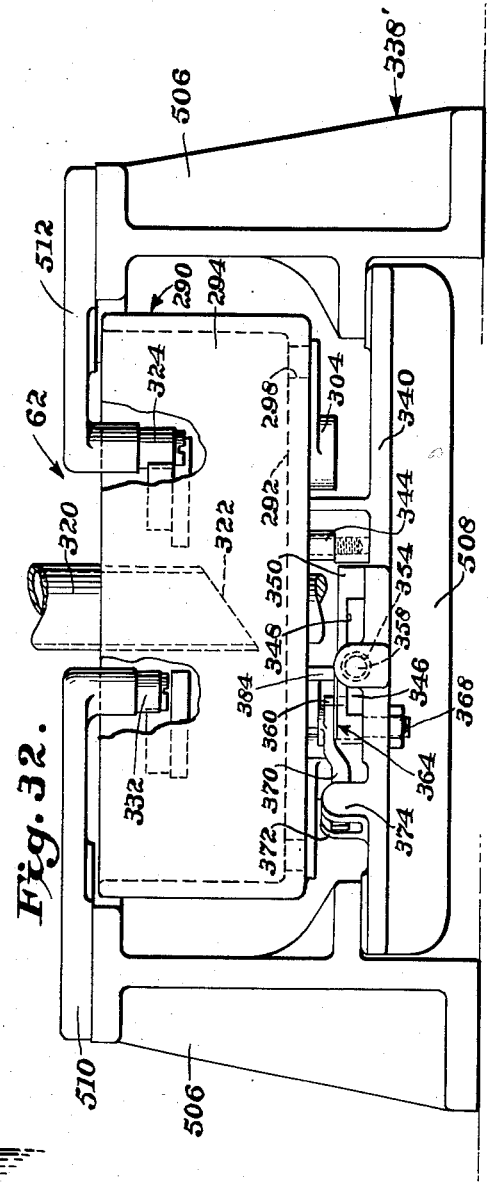
INVENTORS:
*Eibe A. Wilckens,*
*William C. Rainer,*
*Edward M. Redding,*
BY *Cushman, Darby & Cushman*
ATTORNEYS.

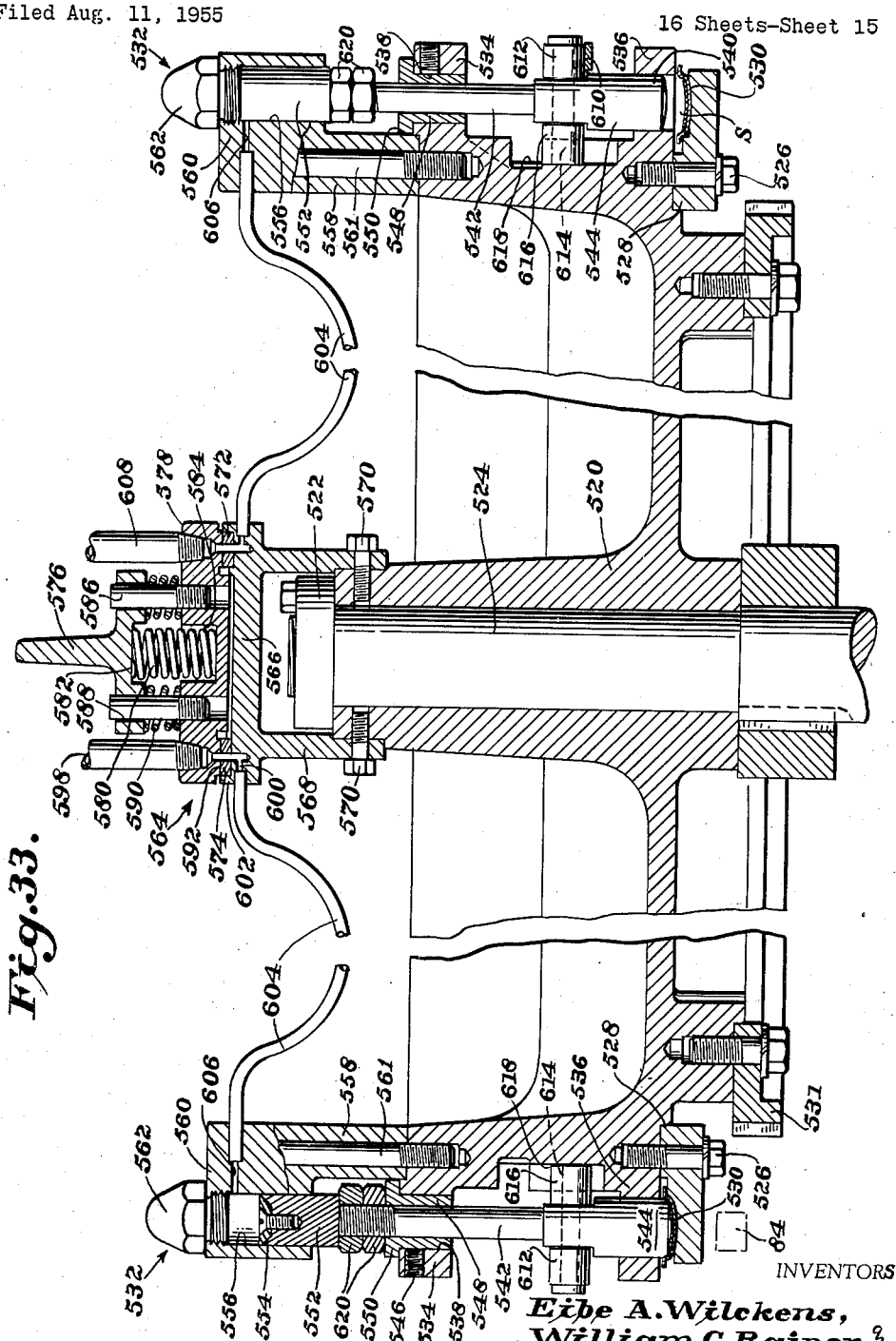

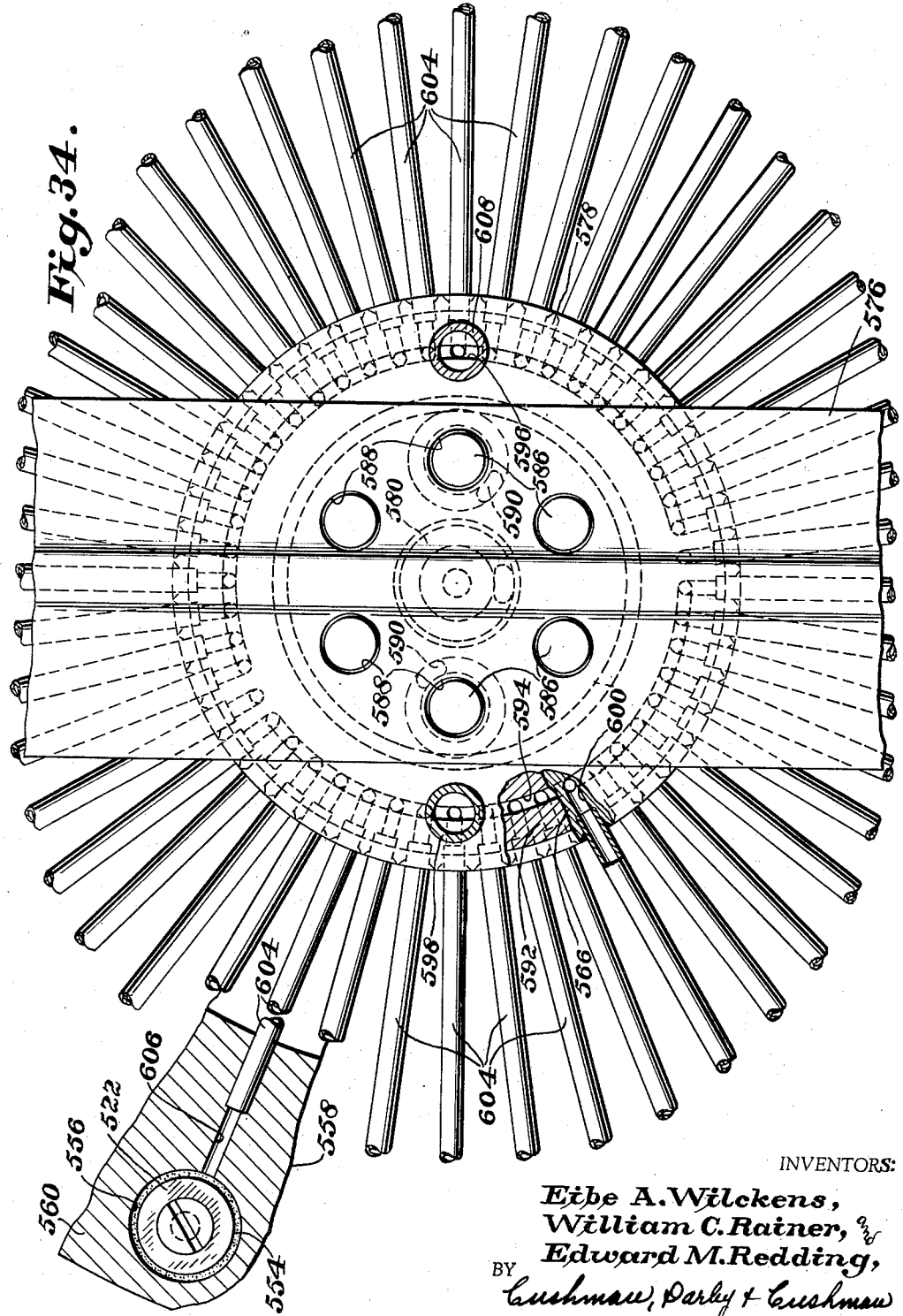

United States Patent Office 2,851,727
Patented Sept. 16, 1958

2,851,727
GRANULAR PLASTIC LINING MACHINE

Eibe A. Wilckens, William C. Rainer, and Edward M. Redding, Baltimore, Md., assignors to Crown Cork & Seal Company, Inc., Baltimore, Md., a corporation of New York Application August 11, 1955, Serial No. 527,710

14 Claims. (Cl. 18—20)

This invention relates to the art of lining closures and more particularly to an improved machine for lining closures, such as bottle crowns and caps, with a granular or powdered moldable sealing material, preferably of plastic.

One object of the present invention is to provide a machine for lining a closure with a cushion liner of a granular moldable sealing material which is continuous in its operation thereby obtaining optimum output.

A further object of the present invention is the provision of an improved plastic sealing material charge supplying mechanism with which the traveling support means for the closures cooperates to deposit a measured charge of sealing material into the central interior of successive closures.

A still further object of the present invention is the provision of a sealing material charge supplying mechanism of the type described which includes improved means operable to permit the supply of a charge only when a closure is presented to receive the charge.

Still another object of the present invention is the provision of a high speed machine operable to supply a measured charge of a granular moldable sealing material into successive closures, to preheat the charges in the closures so as to soften the same in the central interior of the closures, and to hot mold the preheated charges in the closures to a desired shape.

These and other objects of the present invention will become more apparent during the course of the following detailed description and appended claims.

The invention may best be understood with reference to the accompanying drawings wherein illustrative embodiments are shown.

In the drawings:

Figure 2 is a fragmentary front elevational view of the machine shown in Figure 1;

Figure 3 is a somewhat schematic horizontal sectional view showing the drive mechanism of the machine;

Figure 4 is a fragmentary top plan view of the shell delivery wheel and feeding dial of the machine illustrating the manner in which the empty shells are transferred onto the combined lining and molding dial mechanism;

Figure 5 is a fragmentary side elevational view partly in section of the charge supplying mechanism showing the same in cooperating relationship with the combined lining and molding dial mechanism, the latter being in vertical cross-section for clear illustration;

Figure 6 is an enlarged, fragmentary top plan view showing a latch member of the combined lining and molding dial mechanism;

Figure 7 is a cross-sectional view taken along the line 7—7 of Figure 5;

Figure 8 is a cross-sectional view taken along the line 8—8 of Figure 5;

Figure 9 is a cross-sectional view taken along the line 9—9 of Figure 5 showing the parts in their normal operating position;

Figure 10 is an enlarged, fragmentary horizontal sectional view showing an upper gate valve of the charge supplying mechanism;

Figure 11 is an enlarged top plan view of an upper gate valve part of the charge supplying mechanism;

Figure 12 is a view similar to Figure 10 showing a lower gate valve of the charge supplying mechanism;

Figure 13 is a fragmentary view similar to Figure 9 showing the parts in their inoperative no-charge position;

Figure 14 is a fragmentary vertical sectional view showing a plunger device of the combined lining and molding dial mechanism in its initial pressure applying position;

Figure 15 is a view similar to Figure 14 showing the plunger device in its final molding pressure applying position;

Figure 16 is a front elevational view of the charge supplying mechanism with parts in vertical section;

Figure 17 is a side elevational view of the shell delivery wheel and feeding dial;

Figure 18 is a front elevational view of the shell delivery wheel and feeding dial;

Figures 19–22 are a series of fragmentary vertical sectional views showing the manner in which the slide members of the combined lining and molding dial mechanism operate to move the shells onto their seats;

Figure 23 is a view similar to Figure 1 showing a modified embodiment of the machine;

Figure 24 is a view similar to Figure 5 illustrating the modified machine;

Figure 25 is a front elevational view of the charge supplying mechanism;

Figure 26 is an enlarged, fragmentary vertical sectional view showing the fluid pressure applying means of the modified machine with the parts in their exhaust position;

Figure 27 is a view similar to Figure 26 showing the parts in their pressure applying position;

Figure 29 is a top plan view showing the charge supplying mechanism of the machine of Figure 28 in cooperative relation to the preheating and lining dial;

Figure 30 is a horizontal sectional view of the structure shown in Figure 29 with the parts in their inoperative no-charge position;

Figure 31 is a view of the structure shown in Figure 29 similar to Figure 5;

Figure 32 is a front elevational view of the charge supplying mechanism of the machine of Figure 28;

Figure 33 is a vertical sectional view of the molding dial mechanism of the machine of Figure 28; and Figure 34 is a fragmentary top plan view of the molding dial mechanism partly broken away.

*General construction and operation*

Figure 1:
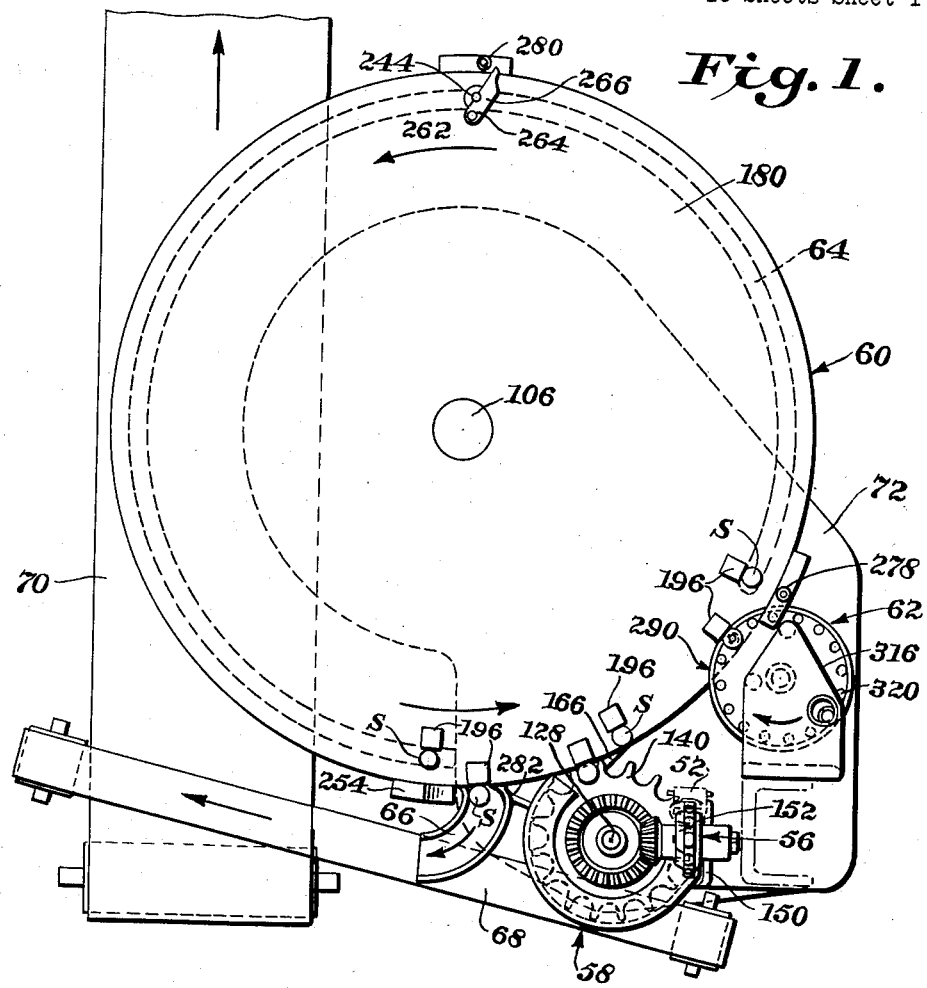
Figure 1 is a somewhat schematic top plan view illustrating one form of a machine embodying the principles of the present invention.

The machines illustrated in the drawings as embodying the principles of the present invention are intended to be used for applying liners of a granular or powdered plastic material to the interior of closures of the crown type. As shown in the drawings, a crown type bottle cap comprises a metal shell S having an annular fluted skirt and a liner L applied to the central interior thereof. Heretofore, the liners have usually been formed of a cork disk and, while certain aspects of the present machines are capable of being used in assembling cork disk lined closures, the invention is particularly directed to the application of granular plastic which is molded under heat and pressure to form liners in the crown shells.

Referring now to the embodiment of the invention disclosed in Figures 1-22, shells S are delivered to the machine from a suitable source (not shown) from where they are directed into a shell feeding mechanism 50, as shown in Figure 2. The shells move downwardly from feeding mechanism 50 in single file by way of a chute 52. Chute 52 includes a rectifier 54 and delivers properly facing shells to a shell delivery wheel 56. The shell feeding mechanism 50, chute 52, and rectifier 54 (shown in phantom lines) are constructed and operate in the manner disclosed in Patent No. 2,703,130, issued March 1, 1955, to Eibe A. Wilckens and Harvey A. Rau and form no part of the present invention. The shell delivery wheel 56 transfers the properly facing shells onto a shell feeding dial 58 as shown in Figures 4, 17 and 18, from where they are transferred onto a combined lining and molding dial mechanism 60.

On the lining and molding dial mechanism 60, the shells are moved into a first radial position wherein a measured charge of granular plastic molding material is deposited into the shells by a charge supply mechanism 62. The charge supplying mechanism 62 includes a no-shell no-charge mechanism 63 operable to prevent the deposit of a charge when no shell is presented to receive the charge. The charged shells are then moved into a second radial position where they are moved past a heating means 64 so as to soften the plastic charges. In addition, while the heated charged shells are in the second radial position, a suitable molding pressure is applied. This pressure is preferably applied in two stages; first, an initial pressure which acts to more or less insure that the softened charges will be distributed evenly within the shells, and second, a final higher molding pressure to shape the liners. The reason for the two stage application of pressure is that if a high final molding pressure is applied too soon to the charges, the latter tend to blister resulting in imperfectly formed liners. It has been found that the final molding pressure need not be applied for a longer period than two or three seconds and the initial pressure is applied mainly to insure that as the granular plastic softens, it will assume an evenly distributed shape within the shell, as noted above.

After the final molding pressure has been applied to the charges within the shells, the finished molded closures are then transferred from the lining and molding dial mechanism 60 onto a chute 66 which directs them onto a transverse conveyor belt 68. From the conveyor 68, the finished closures are transferred, as by a paddle wheel (not shown) onto a main inspection conveyor 70.

As shown in Figures 1-3, the various dials and mechanisms noted above may be suitably mounted on a main frame or table 72 which houses a suitable drive mechanism 74 for imparting rotation to the various dials and mechanisms.

The lining and molding dial mechanism 60 noted above is intended to apply the two stage pressure by means of spring energy suitably controlled in a manner hereinafter to be more fully described. In Figures 23-27, there is shown a similar machine embodying a modified means for applying two stage pressure wherein the initial pressure is applied by spring energy and the final molding pressure is applied by fluid energy.

In Figures 28-34, there is shown a modified form of machine embodying the principles of the present invention which includes the shell feeding mechanism 50, chute 52, rectifier 54, shell feeding wheel 56, and shell feeding dial 58 noted above in regard to the embodiment of Figures 1 through 22. The empty shells on the shell feeding dial 58 are transferred onto a preheating and lining dial 76 which carries the empty shells past a charge supplying mechanism, similar to the charge supplying mechanism 62 but suitably modified to accommodate the different machine. After the shells have received a charge from the modified charge supplying mechanism 62, they are moved past a heating means 80 which is operable to soften the charges within the shells. The preheated charged shells are then transferred from the preheating and lining dial 76 onto a molding dial mechanism 82 where they are subjected to further heat, as by heating means 84, and a final molding pressure is applied to form finish molded liners. The finished closures are transferred from the molding dial mechanism 82 onto a chute 86 which directs them onto a transverse endless conveyor 88. A paddle wheel (not shown) transfers the closures from the conveyor 88 onto a main inspection conveyor 90.

The various dials and mechanisms of the machine of Figures 28-34 may be suitably mounted above a main frame or table 92 and provided with a drive mechanism similar to the drive mechanism 74 previously described but suitably modified to impart rotary motion to the different dials and mechanisms of the different machine. The detailed construction and operation of each of the dials and mechanisms of all of the embodiments noted above are hereinafter described in detail.

*Drive mechanism*

As shown in Figure 3, the drive mechanism 74 comprises a main drive shaft 100 suitably journalled in the main frame 72 for rotation about a horizontal axis. The drive shaft 100 may be driven from any suitable source of power (not shown). A worm gear 102 is fixedly mounted on the central portion of the drive shaft by any suitable means and is arranged to mesh with a gear 104 fixed to a vertical shaft 106. Shaft 106 is journalled in the main frame 72 by a bearing 108 and the upper end thereof carries the combined lining and molding dial mechanism 60. The charge supplying mechanism 62 is driven by a shaft 110 journalled in the frame 72, as by bearing 112. The shaft 110 is drivingly connected with the shaft 106 through a suitable gear train which includes a large pinion gear 114 affixed to the combined lining and molding dial mechanism shaft 106, a gear 116 affixed to the shaft 110 and a pair of intermediate idler gears 118 suitably journalled in the frame so as to mesh with each other and the respective gears 114 and 116. The Wilckens and Rau shell feeding mechanism 50 may be driven from a vertically extending shaft 120 drivingly connected with the gear 116 by means of a suitable gear train including a spur gear 122 fixedly mounted on the shaft 120 and idler gears 124 and 126. The idler gears 124 and 126 may be suitably journalled within the frame 72 for rotation about a common vertical axis, the gear 124 being of a smaller size and meshing with the gear 122 while the gear 126 is of a larger size and meshes with gear 116.

The shell feeding dial 58 is driven by a shaft 128 journalled in the frame 72, as by bearing 130, and is drivingly connected with the large pinion gear 114 of shaft 110 through a suitable gear train including a spur gear 132 fixedly mounted on the shaft 128 by any suitable means and a pair of intermediate idler gears 134. The idler gears 134 may be journalled within the frame by any suitable means so as to mesh with each other and with the respective gears 114 and 132.

*Shell delivery wheel and feeding dial*

The shell feeding dial 58, as more particularly shown in Figures 4, 17, and 18, includes a circular dial plate 140 fixedly mounted on the upper end of shaft 128. The plate 140 is provided with a plurality of circumferentially spaced pockets or seats 142 within which the empty shells are adapted to be positioned. Secured to the shaft 128 above plate 140 is a bevel gear 144 arranged to mesh with a cooperating bevel gear 146 journalled on one end of a shaft 148, the other end of which is fixedly mounted above the table by a suitable support 150. The shell delivery wheel 56 comprises a wheel plate 152 fixedly connected with gear 146 for rotation therewith about shaft 148. Fixedly mounted on the plate 152 are a plurality of radially extending fingers or pads 154 disposed in circumferentially spaced relation around the entire periphery thereof. As shown in Figure 18, these pads are preferably made integral with the plate 152 and are operable to enter within the interior of the properly facing empty shells issuing from the chute 52 so as to transfer them from the lower end of the chute into the pockets 142 of the dial plate 140.

A segmental guard rail member 156 is fixedly mounted by any suitable means on the table 72 in surrounding relation to the portion of the outer periphery of the dial plate extending between the shell delivery wheel 56 and the lining and molding dial mechanism 60. The member 156 is preferably L-shaped in cross-section and includes a horizontally disposed leg 158 spaced above the dial plate pockets sufficiently to permit free passage of the shells therebelow and a vertically disposed leg 160 spaced outwardly of the dial plate pockets sufficiently to prevent radial movement of the shells during their movement with the dial. The end of the horizontal leg 158 adjacent the shell delivery wheel 56 is provided with a cut out portion 162 through which the wheel plate 152 extends. The cut out end of horizontal leg 158 is thus positioned so as to engage the upper edge of the shells carried by the pads 154 and serves to insure that the shells are stripped from the pads. A horizontal plate 164 is fixedly mounted by any suitable means on the table 72 just below the dial plate pockets adjacent wheel plate 152 to support the shells as they are stripped or freed from the pads so as to insure that they will be correctly positioned in the dial plate pockets.

The shells are moved by the dial plate pockets along plate 164 until the end thereof is reached after which the pockets serve as their sole support. A second horizontal plate 166 is fixedly mounted by any suitable means on the table 72 just below the dial plate pockets adjacent the lining and molding dial mechanism 60 to support the shells as they are transferred thereto.

*Combined lining and molding dial mechanism*

As best shown in Figure 5, the combined lining and molding dial mechanism 60 comprises a main dial frame 180 fixedly secured by any suitable means to the shaft 106 above the table 72. Secured in vertically spaced relation to the lower outer periphery of the dial frame 180 by any suitable means, such as by bolts 182, is a lower annular ring 184 having a plurality of circumferentially spaced outer pockets or seats 186 formed in the upper surface thereof and a corresponding plurality of circumferentially spaced inner pockets or seats 188. These seats 186 and 188 serve to support the shells during their movement on the combined lining and molding dial mechanism 60 as will be more fully explained hereinafter. An upper annular ring 190 is interposed between the lower surface of the dial frame 180 and the upper surface of the lower ring 184 and may be secured in position by means of the bolts 182 previously described. The lower surface of the ring 190 is provided with a plurality of radially extending grooves 192, a groove being disposed above each seat, for slidably receiving a plurality of radially disposed slide members 194.

As shown in Figures 4, 5 and 19–22, each slide member 194 is provided with a magnet 196 which is disposed on the outer end thereof and arranged to contact the shells S. The rearward end of each slide member 194 has a depending vertical stub shaft 198 secured thereto by any suitable means, such as welding or the like. Each of the stub shafts 198 has journaled thereon a cam roller 200 which is secured below the associated slide member 194 by any suitable means, such as nut 202. Cam rollers 200 are arranged to cooperate with a cam track 204 which serves to move the slide members radially, as will hereinafter more fully appear. The cam track 204 comprises a circular supporting frame 206 having a pair of concentric upstanding rings 208 and 210. The rollers 200 extend within a cam groove 212 formed by a pair of circular ring members 214 and 216 rigidly mounted on the rings 208 and 210, respectively and extending inwardly therefrom.

Referring now more particularly to Figure 4, it will be seen that the cam track 204 positions the cam rollers 200 and hence, the slide members 194 so that the magnets 196 on the outer ends thereof will be in an extreme outer position to thereby engage the empty shells issuing from the shell feeding dial 58. The magnets engage the empty shells and as the slide member is moving radially inwardly, the shells are moved by the magnets onto the outer seats 186 of the dial. The shells are maintained on seats 186 during their movement with the dial frame 180 past the charge supplying mechanism 62, which is arranged to supply a measured charge of granular plastic material into each shell as it moves thereby. In order to guide the granular plastic material into the shells, a lower annular flange 218 (see Figure 5) is formed on the dial frame 180 at the lower peripheral end thereof. A series of circumferentially spaced funnel shaped apertures 220 extend through the outer end of the annular flange 218, an aperture 220 being disposed above each of the seats so as to funnel the granular material into the central interior of the shells. If desired, concentric apertures 222 may be formed in the lower annular ring 184.

After the charges have been deposited into the shells, cam track 204 operates cam rollers 200 to move the slide members 194 radially inwardly so that the magnets 196 thereof will move the associated shells from the seats 186 onto the adjacent seats 188 preparatory to the molding operation, see Figures 19–22.

In order to apply a suitable molding pressure to the charges within the shells, a plunger device 224 is mounted on the outer periphery of the dial frame 180 above each of the seats 188. Consequently, the outer periphery of the dial frame 180 is provided with an intermediate annular flange 226 spaced above the flange 218 and an upper annular flange 228 spaced above the flange 226. Flanges 218, 226 and 228 are provided with a series of circumferentially spaced, concentric apertures 230, 232 and 234, respectively, within which the plunger devices 224 are mounted for vertical reciprocation.

Each of the plunger devices 224 includes a plunger 236 having a plunger head 238 on the lower end thereof which is reciprocable within an associated aperture 230. Disposed within the aperture 232 in flange 226 is a bushing 240 having an upper annular flange 242. The bushing 240 may be fixedly mounted within the aperture 232 by any suitable means and is adapted to slidably receive the upper end portion of the plunger 236. Flange 242 serves to limit the downward movement of the plunger as will be more fully explained hereinafter.

Mounted on the upper end of each plunger 236 is a separable stem member 244 which may be rigidly secured to the plunger by any suitable means. A collar 246 is mounted between the upper end of the plunger and the stem member 244 and receives the lower end of a coil spring 248 disposed within aperture 234 in surrounding relation to the stem element 244. The upper end of spring 248 bears against a cap 250 which is threadedly engaged within the upper end of the aperture 234 and which slidably receives the upper end of the stem 244. Spring 248 thus serves to resiliently urge the plunger downwardly into engagement with the charge within the shell. A pair of cooperating stop nuts 252 are threadedly mounted on the upper end of the plunger, the lower of which is arranged to engage flange 242 so as to limit the downward movement of the plunger.

In order to move each of the plungers into a raised position so as to permit free movement of the associated slide member 194, and the shell moved thereby, a short cam track 254 is suitably mounted on the main frame or table 72 in fixed relation thereon. Cam track 254 is fixedly positioned adjacent the outer periphery of the dial frame so as to engage a cam roller 256 journaled on the outer end of a horizontally disposed shaft 258 extending through the central portion of each of the plungers 236. The inner end of each shaft 258 is provided with a guide roller 260 which is operable within a vertically extending slot 262 formed in the adjacent portion of the dial frame. The engagement of the guide rollers 260 within slots 262 serves to prevent the plungers from rotating about their own axes so that cam rollers 256 will at all times be disposed in a position to engage the cam track 254.

As shown in Figure 5, each plunger is maintained in its raised position by means of a latching device which will now be described. Mounted on the upper surface of the dial frame adjacent each plunger device 224 is a stud 264 having its lower end threadedly engaged within the dial frame. A latch member 266 is pivotally mounted on each stud 264 and a coil spring 268 surrounding each stud has one of its ends connected with the latch member, as by aperture 270, and its opposite end connected with the upper end of the stud as by a nut 272. Spring 268 thus resiliently urges each latch member into engagement with the upper end of the associated stem element 244. The upper end of each stem element 244 is provided with a pair of vertically spaced notches 274 and 276 within which the latch member is adapted to engage. It will be seen that when cam track 254 engages the cam roller 256 to move the plunger upwardly, the lower notch 276 will be positioned so that the latch member will be urged into engagement therewith. In this manner, the plunger head 238 is maintained in a raised position, such as shown in Figure 5, permitting the free movement of the slide member 194 and the associated shell thereunder.

Referring now to Figure 1, it will be seen that cam track 254 is positioned adjacent the outer periphery of the dial frame at a point just ahead of the point where the finished closures are transferred from the dial mechanism. As noted above, cam track 254 serves to raise the plungers and the latch members 266 maintain them in their raised position due to their engagement within the notches 276. Thus, when each plunger moves past the shell feeding dial 58, it will be disposed in a raised position permitting the associated slide member 194 to move into its outermost position so that its magnet may engage a shell S and move the same onto the associated outer seat 186. The plunger is maintained in a raised position during the movement of the shell past the charge supplying mechanism 62, while the shell remains on seat 186. After the charge has been received in the shell, the charged shell is moved onto the adjacent inner seat 188 in the manner previously noted. Next, the outer end portion of the latch member 266 engages a trip roller 278 suitably mounted on the main frame 72 in fixed relation thereon in a position adjacent the outer periphery of the dial. This trip roller is arranged to engage the latch member and pivot it about the stud 264 away from stem element 244 and out of the notch 276. In this manner, the plunger is free to move downwardly into engagement with the charge within the shell under the action of spring 248. It will be understood that the engagement of the latch member 266 with trip roller 278 is momentary and that spring 268 serves to return the latch member 266 rapidly into engagement with the stem element 244. Hence, latch member 266 will enter the upper notch 274 and thus limit the amount of initial pressure which the plunger head applies to the charge by reason of spring 248.

Figure 14 illustrates the initial pressure engagement of the plunger head with the charge and in this condition the charge, during the movement of the dial, is subjected to heat by means of the heating means 64, which preferably is in the form of a gas burner. As the charge softens under the heat of the gas burner, it tends to assume an evenly distributed configuration within the shell due to the engagement of the plunger head therewith. After the charge has been heated and softened to a point sufficient to apply a final molding pressure thereto, a second trip roller 280 is engaged by the latch member 266. As shown in Figure 1, trip roller 280 is suitably mounted on the main frame in fixed relation by an suitable means and is disposed adjacent the outer periphery of the dial frame. Engagement of the trip roller 280 will pivot the latch member out of engagement with the stem element 244 and notch 274 permitting the full force of spring 248 to urge the plunger head into engagement with the charge. This condition is illustrated in Figure 15 and it will be noted that the amount of added downward movement of the plunger is very slight. The final molding pressure is maintained for a short period after which the associated cam roller 256 engages cam track 254 which moves the plunger into its raised position. Simultaneously with the raising of the plunger, cam track 204 operates to move the slide member 194 outwardly so as to move the finished closure from seat 188 past seat 186 and deposit the same onto the chute 66. Chute 66 includes a stripper bar 282 to separate the closures from the magnets and directs the finished closures onto transverse conveyor 68 from where they are transferred to main inspection conveyor 70.

*Charge supplying mechanism*

The charge supplying mechanism 62 comprises a hopper 290 which is suitably secured to the upper end of the shaft 110 in fixed relation thereto. The hopper 290 includes a horizontal dial plate 292 having a vertical wall 294 extending upwardly from the outer edge thereof, and a hub 296 extending upwardly from the center portion thereof. The dial plate 292 is provided with a plurality of circumferentially spaced apertures or pockets 298 which extend vertically therethrough for receiving a predetermined amount of the plastic material.

Adjacent each of the pockets 298 and spaced radially inwardly thereof is a vertical pin 300 which extends upwardly through the dial plate and through an annular ring 302 rigidly mounted, in any suitable manner, on the upper end of the hub 296. Rotatably mounted on the lower head end of each pin 300 is a lower shutter or gate valve 304, the upper surface of which engages the lower surface of the dial plate 292. An upper shutter or gate valve 306 is mounted on each pin 300 above the dial plate 292 by means of a slot and key connection 308 which permits the upper gate valve to move axially with respect to the pin. A spring 310, surrounding each pin between the upper end of the associated upper gate valve 306 and the lower end of a collar 312 suitably fixed to the upper end portion of the pin 300, urges the lower surface of upper gate valve 306 into engagement with the upper surface of the dial plate and the upper surface of lower gate valve 304 into engagement with the lower surface of the dial plate.

As shown in Figures 7–13, the upper and lower gate valves are arranged to open and close the upper and lower ends of the charge measuring pockets 298 in timed relation so that each pocket may be filled with granular plastic material through its open upper end with its lower end closed, and discharge the granular material into a shell S through its open lower end with its upper end closed. To this end, an upper frame member 314 is suitably secured to the main frame 72 in fixed relation, and has a plate 316 extending horizontally therefrom above the hopper 290. Plate 316 includes an aperture 318 through which a chute 320 extends so as to position the same in fixed relationship to the hopper. The chute 320 is adapted to feed granular plastic material to the hopper and the level of the plastic material in the hopper is automatically maintained by the material accumulating against the beveled open end 322 of the chute. The pressure thus created against the plastic material in the chute will prevent it from falling into the hopper. As the level of the material in the hopper drops, this pressure will be relieved and additional material will flow down the chute.

As shown in Figure 7, each upper gate valve 306 is disposed in its open position and the associated lower gate valve 304 is disposed in its closed position when the associated pocket moves beneath the beveled end 322 of the chute. It will be understood that since spring 310 resiliently urges the gate valves into engagement with the dial plate, they will be maintained in the position to which they have been moved. The upper gate valve 306 is moved into its open position such as illustrated in Figure 8, by means of a cam roller 324 mounted on the outer end of the plate 316 by any suitable means, such as bolt 326. Cam roller 324 is adapted to engage the outer cam surface 328 of a cam follower 330 fixedly mounted on the upper end of each pin 300 above annular ring 302. The upper gate valves 306 are moved into a closed position by a second cam roller 332 suspended from the plate 316 by means of a bolt 334 spaced from the bolt 328. The cam roller 332 is adapted to engage an inner cam surface 336 formed on each of the cam followers 330. It will be understood that since both the cam followers 330 and the upper gate valves 306 are connected with the associated pin 300 for rotation therewith, movement of the cam follower will move the associated upper gate valve between an open and closed position.

Suitably mounted on the main frame 72 in fixed relation thereto, is a subframe 338 disposed below the hopper 290. The subframe 338 includes a horizontal flange or ledge 340 upon one end of which a bolt 342 is mounted. A cam roller 344 is journaled on the bolt 342 and is adapted to engage an inwardly extending cam surface 345 formed on each lower gate valve so as to move the same into its closed position as shown in Figure 9.

Lower gate valves 304 are moved into an open position so as to discharge a predetermined amount of granular plastic material into the shells carried by the combined lining and molding dial mechanism 60, by the no-closure no-charge mechanism 63 which will now be described.

The no-closure no-charge mechanism 63 includes a shell engaging member 346 which is disposed on the upper surface of ledge 340 and is mounted for horizontal reciprocation within a groove 348 formed in the lower surface of a member 350 suitably mounted on the ledge. The shell engaging edge of the member 346 is provided with a slot 351 which has a cross-sectional configuration conforming with the shape of the outer fluted edge of the shells so as to receive the same. The width of the shell engaging surface of member 346 is of a distance sufficient to engage two closures mounted on adjacent seats 186 but less than the space between two closures carried on the outer seats of three adjacent seats. In this manner, the shell engaging member 346 will be maintained in an operative position so long as each seat 186 moving thereby contains a shell S. If the series of shells carried by the dial mechanism 64 is interrupted, the shell engaging member 346 will move inwardly of the dial mechanism 60 as the empty seat moves thereby. Movement of the shell engaging member 346 is accomplished by means of a spring 352 disposed within a horizontal bore 354 formed in the adjacent portion of the subframe. One end of spring 352 urges a slidable plug 356 into engagement with the member 346, while its opposite end engages a fixed plug 358 threadedly engaged within the free end of the bore 354.

The shell engaging member 346 is provided with an upwardly extending rigid lug 360 arranged to be engaged by one arm 362 of a bell crank 364. Bell crank 364 further includes a central hub portion 366 pivoted upon a vertical pin 368 suitably mounted on the ledge 340 and a second arm 370. The outer end of arm 370 extends between a pair of upstanding horizontally spaced lugs 372 and 374 which form a rigid part of the ledge 340. Lug 374 includes a horizontal bore 376 within which is mounted a coil spring 378 arranged to engage the outer end of arm 370 and hence, urge the bell crank in a clockwise direction as viewed in Figure 9. An adjusting screw 380 is threadedly mounted in lug 372 and has its inner end positioned to engage the outer end of arm 370 so as to maintain the bell crank in an adjusted operative position. A nut 382 may be threadedly mounted on the outer end of adjusting screw 380 so as to lock the same in any selected position of adjustment. The outer end of bell crank arm 362 includes an upturned cam projection 384 which is arranged to engage an outwardly extending cam surface 386 formed on each of the lower gate valves 304.

The charge supplying mechanism 62 operates as follows. As previously noted, plastic material in chute 320 will be maintained therein due to the pressure created by the accumulation of the material in the hopper 290 against the beveled opened end 322 thereof. The pockets 298 adjacent the chute have their lower end closed by lower gate valves 304 and their upper ends are open with upper gate valves 306 being disposed in their opened position. In this manner, as each pocket moves beneath the open end of the chute, material will fall into the pocket as it moves thereby. This will reduce the accumulation of plastic against the lower beveled end 322 and will relieve the pressure of the material in the chute so as to permit a small additional amount of material to flow from the open end thereof. The filled pocket moves, during the rotation of the hopper, with the upper and lower gate valves in the condition noted above until cam surface 336 of the associated cam follower 330 engages cam roller 332 whereupon the associated upper gate valve 306 is moved into its closed position. It will be noted that by virtue of the resilient engagement between the dial plate 292 and the upper gate valve, the latter will be effectively maintained in its closed position. Moreover during the movement of the upper gate valve into its closed position, any excess material disposed above the open upper end of the pocket will be removed so that an exact predetermined amount of material is enclosed within the pocket.

Assuming that each of the seats 186 passing the charge supplying mechanism 62 contains a shell S, the shell engaging member 346 will be maintained in its operative position shown in Figures 5 and 9. With the member 346 in this position, spring 378 urges the outer end of the second arm 370 of bell crank 364 into engagement with the end of adjustment screw 380 and the cam projection 384 on the outer end of the first arm 362 will be disposed in a position to engage the cam surface 386 on the lower gate valve 304. As the filled pocket moves in timed relationship to the dial mechanism 60 into a position above a corresponding funnel shaped aperture 220, cam projection 384 will engage cam surface 386 to move the lower gate valve into its open position permitting the charge within the pocket to drop into the aperture 220, from where it is funneled into the central interior of the shell.

As the hopper 290 continues to rotate, cam surface 345 on the lower gate valve will engage cam roller 344 so as to move the lower gate valve back into its closed position. Next, cam surface 328 of cam follower 330 engages the cam roller 324 to move the associated upper gate valve into its open position. In this condition, the pocket then moves beneath the supply chute 320 and the cycle is repeated.

If a shell is not present on one of the seats 186 of the dial mechanism 60 as it moves past the charge supplying mechanism 62, the shell engaging member 346 will be moved inwardly of the dial mechanism 60 by tthe action of spring 352. During the movement of the shell engaging member 346, the lug 360 thereof in engagement with the outer end of arm 362 operates to pivot the bell crank 364 against the action of spring 378 in a counterclockwise direction as viewed in Figure 9 into the position shown in Figure 13. It will be understood that spring 352 is of a strength sufficient to overcome the action of spring 378 so as to permit such movement. In this manner, when the pocket carrying the charge to be deposited into the aperture 220 associated with the empty seat approaches the cam projection 384, the latter will be moved out of the path of cam surface 386 so that the associated lower gate valve 304 will not be moved into its open position and no discharge of the plastic material will take place. If a shell is present on the next adjacent seat 186, this shell will engage the edge of the member 346 and move the latter against the action of spring 352. Spring 378 then acts to return the bell crank to its normal position in engagement with the adjusting screw 380 so that normal operation will be resumed.

*Molding pressure applying means of Figures 23–27*

As mentioned above, the charges within the shells on the combined lining and molding dial mechanism 60 are subjected to an initial lower pressure and a final higher molding pressure. In the embodiment of the invention disclosed in Figures 1–22, both the initial and final pressures are applied by springs. In Figures 23–27, there is shown a modified form of pressure applying means wherein the initial pressure is applied by springs and the final molding pressure is applied by a pressurized fluid.

Referring now to Figures 23 and 24, it will be seen that the plunger devices 224 of the modified combined lining and molding dial mechanism are maintained in their raised position by a cam track 390 which is fixedly secured to the main frame 72 in a position to extend around the periphery of the dial frame from a point just ahead of the chute 66 to a point just beyond the charge supplying mechanism 62. This cam track which replaces the latch members previously described, engages cam rollers 256 and likewise serves to maintain the plunger heads 238 out of engagement with slide members 194, during the transfer of the shells from the shell feeding dial and the deposit of the charge into the shells. As before, after the charges have been deposited into the shells, cam track 204 operates each cam roller 200 to move the associated slide member 194 inwardly whereupon its magnet acts to move the charged shell from outer seat 186 onto the adjacent inner seat 188. Cam track 390 then terminates and the plunger devices are moved downwardly by a modified pressure applying means which will now be described.

In the present modified embodiment of the invention, stem elements 244 previously described are dispensed with and pistons 392 are utilized in lieu thereof. Each piston 392 is slidably disposed within an aperture 234 which constitutes a cylindrical bore or chamber for the piston. An O-ring seal 394 may be provided on each piston 392 to insure pressure tight engagement of the piston within its bore. The upper end of bore 234 is closed by means of a plug 396 threadedly engaged therein and having an O-ring seal 398 arranged to engage the upper surface of the dial frame 180. Each plug 396 further includes a depending stop projection 399 arranged to engage the upper end of the associated piston 392. A vertical bore 400 extends upwardly from the lower end of each piston to receive a coil spring 402, the lower end of which engages the upper end of the plunger. Upon the termination of cam track 390 during the operation of the dial mechanism, spring 402 acts to move the plunger head 238 downwardly into engagement with the charge within the shell.

A fluid pressure control valve, generally indicated at 404, is provided adjacent each plunger device 224 for controlling the application of the final higher molding pressure. As best shown in Figures 26 and 27, each pressure control valve 404 comprises a vertically disposed valve stem 406 mounted for reciprocation within a vertical bore 408 extending downwardly from the upper surface of the dial frame inwardly of each bore 234.

The upper end of each bore 408 includes an enlarged chamber 410 which communicates with the upper end of the associated bore 234 by means of a horizontal passageway 412. The open upper end of each chamber 410 is closed by means of a plug member 414 having an O-ring seal 416 arranged to engage the upper surface of the dial frame. Each plug member 414 is suitably apertured to receive the upper end of the associated valve stem 406 and is provided with a pair of upwardly and outwardly extending ears 418. Mounted on a horizontal pin 420 extending between each pair of ears 418 is a bell crank 422 having an inner arm 424 and outer arm 426. The outer end of inner arm 424 is bifurcated and curved as at 428, the curve bifurcations fitting within oppositely facing slots 430 formed in the upper end of the associated valve stem. The outer end of arm 426 has a cam roller 432 suitably journaled thereon for a purpose hereinafter to be more fully explained.

Each valve stem 406 is formed with a bore 434 which extends upwardly from the lower end thereof into its central interior. An upper series of radially extending ports 436 communicate the upper end of the bore 434 with the chamber 410. A lower series of radially extending ports 438 communicate the lower end of the valve stem bore 434 selectively with either an upper annular inlet groove 440 or a spaced lower annular outlet groove 442, depending upon the position of the valve stem as will hereinafter be more fully described. Preferably, suitable O-ring seals 444 are provided within bore 408 to negage the valve stem on opposite sides of the annular grooves 440 and 442. The lower end of valve stem bore 434 is closed by means of a threaded plug 446 and the lower end of each bore 408 may be vented to the atmosphere by means of a radially extending aperture 448.

As shown in Figure 24, compressed air is supplied to the control valves 404 from a suitable source (not shown) by means of a centrally disposed swivel joint connected to the upper end of a central pipe 450, the lower end of which is fixedly connected with the upper end of the dial frame hub by means of a flanged collar 452 having an O-ring seal 454 arranged to engage the upper surface of the hub. The upper end of shaft 106 is disposed below the flanged collar 452 and is likewise provided with an O-ring seal 456 so that a central pressure tight chamber 458 is formed above the upper end of the shaft by the upper end of the dial frame hub and flanged collar 452. A series of apertures 460 extend radially through the upper end of the dial frame hub so as to communicate the chamber with one end of a hose 462 fitted within the outer end of each aperture 460. The opposite end of each hose is fitted within an aperture 464 extending radially through the outer portion of the dial frame into communication with the associated annular inlet groove 440.

As was previously described, upon the termination of cam track 390, the plunger devices will be moved downwardly under the influence of spring 402 to apply an initital pressure which is maintained while the charged shells are moved past heater 64 which acts to soften the charges until they are prepared to receive the final molding pressure. It will be noted that the strength of spring 402 may not be sufficient to mold the charges within the shells and serves mainly to maintain the plunger heads in engagement therewith so that as the charges soften, the same will be distributed evenly throughout the shell. It will also be noted that during the time each plunger device is in its raised position as well as during the application of the initial pressure by spring 402, the associated valve stem 406 is disposed in the position shown in Figure 26 wherein the upper end of bore 234 is in communication with the atmosphere through passageway 412, chamber 410, upper ports 436, central bore 434, lower ports 438, annular outlet groove 442, and an exhaust or outlet aperture 466 extending from groove 442 radially through the dial frame. The compressed air is closed off from the upper end of bore 234 by the valve stem and the engagement therewith of the O-ring seals 444 on opposite sides of the annular inlet groove 440.

When the charges have been softened sufficiently to apply the final higher molding pressure, cam rollers 432 engage a suitable cam track 468 fixedly mounted on the main frame 72 adjacent the outer periphery of the dial so as to pivot the bell crank 422 in a clockwise direction as viewed in Figure 24. During the movement of the bell crank, inner arm 424 will move upwardly carrying with it, by virtue of the engagement of curved bifurcated ends 428 in slots 430, the valve stem 406. As shown in Figure 27, this upward movement of valve stem 408 will position the lower series of ports 438 in communication with the annular inlet groove 440 thus permitting pressurized fluid in the form of compressed air to flow therefrom through lower ports 438, central bore 434, upper ports 436, chamber 410, passageway 412, and into the upper portion of the bore 234. The movement of compressed air into the bore 234 will initially move the piston 392 downwardly against upper stop nut 252, thus compressing spring 402. With the piston rigidly engaging the plunger through stop nut 252, the entire force of the compressed air will be directly transmitted to the plunger head in engagement with the charge within the shell. This pressure is maintained for a short period during which time the charge is formed into a final molded shape.

After the final molding pressure has been applied to shape the liners, cam roller 432 engages a second cam track 470, which like cam track 468, is suitably mounted on the main frame in fixed relation thereto. Cam track 470 is disposed adjacent the outer periphery of the dial frame so as to engage the lower surface of cam roller 432 and hence, pivot the bell crank 422 in a counterclockwise direction as viewed in Figure 24. This movement of the bell crank will move the stem valve downwardly into its original position wherein the source of compressed air is closed off from the upper end of bore 234 and the latter is communicated with the atmosphere. As the upper portion of bore 234 is exhausted, spring 402 acts to move the piston 392 upwardly until it engages the stop projection 399. Cam track 390 is then engaged by cam roller 256 to move the plunger device into its raised position so that the finished closure may be moved from its seat 188 past seat 186 and into the chute 66 by the action of slide member 194 in a manner previously described. As before, chute 66 delivers the finished closures to transfer conveyor 68 from where they are transferred to main inspection conveyor 70.

*Preheating and lining dial of Figures 28-34*

As mentioned earlier, the twin dial machine illustrated in Figures 28-34 incorporates all of the empty shell handling equipment heretofore described in connection with the embodiment disclosed in Figures 1-22. However, a different means is provided for transferring the empty shells from the shell feeding dial onto the preheating and lining dial of the modified machine. To this end, the shell feeding dial 58 is provided with a guide member 476 disposed just above the pockets 142 adjacent the meeting point of the two dials. The guide member 476 may be suitably mounted in fixed relation on the main frame 92 and includes a cam surface 478 arranged to engage the shells in pockets 142 and transfer them onto the preheated and lining dial 76.

As shown in Figure 31, the preheated and lining dial 76 comprises a hub 480 secured to the upper end of a shaft 481 and having a pair of vertically spaced annular flanges 482 and 484 extending radially outwardly therefrom. The lower annular flange 482 has suitably secured thereto, a lower annular ring gear 486 provided with a series of peripheral teeth for a purpose hereinafter to be described. An annular insulating member 490 is suitably secured to the central upper surface of ring gear 486 and has a shell supporting ring 492 suitably secured to the upper surface thereof. The outer upper surface of the ring 492 is provided with a plurality of circumferentially spaced pockets or seats 494 which receive the empty shells as they are transferred onto the preheated and lining dial by cam surface 478. If desired, a vertically disposed aperture 496 may be formed in the ring 492 through each seat 494.

Secured to the upper annular flange 484 is a circular plate 498 having its outer edge bent downwardly as at 500 and provided with a series of funnel shaped apertures 502 corresponding in number to the number of seats and being disposed in vertical alignment therewith. It will be seen that the empty shells received from the shell feeding dial will be carried on the seats 494 past the charge supplying mechanism 62 where a measured charge of plastic material is deposited therein in the manner previously indicated.

As shown in Figure 31, the charge supplying mechanism 62 is preferably driven by direct connection with the annular ring gear 486 through a spur gear 504 suitably mounted on the shaft 110 in a fixed relation thereto. It will be understood that in order to permit the incorparation of this gear below the hopper 290, suitable changes may be made in the subframe of the charge supplying mechanism. For example, in Figure 32 there is shown a modified subframe 338' which includes a pair of horizontally spaced vertical standards 506. Ledge 340 is provided by an angular frame member 508 extending between the standards 506 above gear 504. Upper cam rollers 324 and 332 may be suitably journaled on inwardly extending plates 510 and 512 secured to the upper end of the respective standards 506.

The charged shells on the preheated and lining dial are then moved past heating means 80 where they are softened sufficiently for the application of a final molding pressure. The heated shells are then transferred directly onto the molding dial mechanism 82 by means of a guide member 514 mounted on the main frame 92 in fixed relation adjacent the meeting point of the two dials. The guide member includes a cam surface 516 positioned to engage the shells and transfer them onto the molding dial.

*Molding dial mechanism*

As shown in Figure 33, the molding dial mechanism 82 comprises a main dial frame 520 fixedly mounted, as by bolted collar 522, to the upper end of a vertical shaft 524. Secured to the lower outer periphery of the frame 520, as by bolts 526, is an annular ring 528 having a plurality of circumferentially spaced seats 530 formed in the upper surface thereof. A plunger device, generally indicated at 532, is carried by the dial frame above each of the seats 530. The dial frame may be driven by means of a ring gear 531 fixedly secured to the shaft 524 and the lower surface of the frame and arranged to be rotated by the gear 486 of the preheating and lining dial by suitable idler gears (not shown). The outer periphery of the dial frame 520 is formed with an upper annular flange 534 and a vertically spaced lower annular flange 536. Flanges 534 and 536 are provided with a series of aligned, circumferentially spaced apertures 538 and 540 respectively, within which the plunger devices 532 are mounted for vertical reciprocation. Each plunger device 532 includes a vertically disposed plunger 542 having a molding head 544 fixedly secured to the lower end thereof which is slidable within an aperture 540. Fixedly mounted, as by set screw 546, within each aperture 538 is a bushing 548 having an upper flange 550. Bushing 548 receives the central portion of plunger 542 and the flange 550 thereof serves to limit the downward movement of the same as will be more fully explained hereinafter.

The upper end of each plunger 542 is fitted with a separable piston member 552 having suitable packing 554 secured to the upper end thereof. Each piston 552 is adapted to reciprocate within a cylindrical chamber or bore 556 formed in an upper dial frame member 558. The frame member 558 is preferably in the form of an annular upstanding ring having a chamber providing a radially extending annular flange 560 disposed in vertically spaced relation to the flange 536. Any suitable means, such as bolts 561, may be utilized to secure the frame member 558 to the main dial frame 520. The upper end of each chamber or bore 556 may be closed by means of a plug 562 threadedly engaged therein.

Fluid pressure applying means, generally indicated at 564, is provided for applying a molding pressure to each piston 552. The fluid pressure applying means 564 includes a plate member 566 having a depending annular flange 568, the lower end of which is secured to the dial frame 520 for rotation therewith, as by bolts 570. The upper surface of the plate 566 is provided with an annular groove 572 for receiving an annular sealing member 574.

Mounted on the table or main frame 92 in fixed relation thereon is a frame member 576 which extends from one side of the molding dial mechanism 82 to the other above the same. The central portion of the frame member 576 carries a plate 578 arranged to cooperate with plate 566. The plate 578 is mounted on the frame member 576 by means of a central coil spring 580 having its upper end engaged within a groove 582 formed in the lower surface of the frame member and its lower end engaged within a groove 584 formed in the upper surface of the plate 578. Disposed in surrounding relation with the central spring 580 is a plurality of annular spaced guide studs 586 having their lower ends threadedly engaged within suitable cooperating threaded apertures in the plate 578. The upper end of each stud 586 extends through a registering aperture 588 formed in the frame member 576 and a coil spring 590 surrounds each stud 586 and bears against the adjacent portion of the plate 578 and frame member 576. It will be seen that the central coil spring 580 and surrounding coil springs 590 resiliently urge the plate 578 downwardly toward the plate member 566 so that an annular portion 592 thereof will engage the sealing member 574 carried by plate member 566 in pressure-tight engagement.

As best shown in Figure 34, a pair of spaced segmental grooves 594 and 596 are formed in the annular portion 592 of the plate 578 and a source of fluid pressure, preferably compressed air, is supplied to the groove 594 by a pipe 598 in communication therewith. The plate 566 is provided with a series of circumferentially spaced ports 600, one port being provided for each plunger device 532 and the sealing member 574 is provided with a corresponding series of apertures 602. The ports 600 communicate with their respective cylindrical chambers 556 by means of a hose 604 having one end connected with the associated port 600 and the opposite end connected with a port 606 communicating with the upper end of the associated cylindrical chamber. An outlet or exhaust pipe 608 leads from the groove 596 so that the ports 600 in communication with the groove 596 will permit the associated cylindrical chambers 556 to exhaust the compressed air held therein while the remaining ports 600 in communication with groove 594 permit compressed air to enter the associated chambers.

Each plunger 542 is moved upwardly when in communication with the exhaust pipe 608 by a cam track 610 suitably mounted on the table 92 in fixed relation thereon. This cam track 610 is arranged to engage a cam roller 612 journaled on the outer end of a horizontally disposed shaft 614 extending through the central portion of each plunger 542. The inner end of each shaft 614 is provided with a guide roller 616 which rides in a groove 618 formed in the adjacent portion of the dial frame 520. The engagement of guide rollers 616 in guide grooves 618 prevents the plungers 542 from rotating or turning about their own axes. Threadedly mounted on each plunger 542 above the bushing 548 is a pair of cooperating stop nuts 620, the lower of which engages the upper surface of bushing flange 550 to limit the downward movement of the plunger head.

Each shell, with a preheated charge of plastic material therein, is moved onto a seat 530 of the molding dial frame 520 from the preheating and lining dial 76 by the guide member 514, with the associated plunger device 532 disposed in the position shown on the right hand side of Figure 33. It will be seen that cam track 610 is in engagement with cam roller 612 so as to maintain the plunger in a raised position suitable to permit free empty of the shell onto the associated seat 530. In addition, it will be noted that the associated chamber 556 is in communication with the exhaust pipe 608 thereby permitting the plunger to assume the raised position.

As the shell is carried around with the dial, cam track 610 terminates to permit the associated plunger to fall by gravity into engagement with the charge within the shell. Next, the associated port 600 moves out of communication with the groove 596 and into communication with the groove 594. This permits compressed air from inlet pipe 598 to communicate with the associated cylindrical chamber 556, through groove 594, ports 602 and 600, hose 604 and port 606, to thereby apply a downward molding pressure to the charge. Before and during the molding of the charge within the shell, the latter is moved past heating means 84, which is preferably a gas burner, so as to insure a hot molding of the charge.

When the hot molding of the charge within the shell is completed, the associated port 600 moves out of communication with the groove 594 and into communication with groove 596 permitting the cylindrical chamber 556 to exhaust. Thus, when cam track 610 engages cam roller 612, the plunger device 532 may move upwardly to dispose the plunger head out of engagement with the shell as shown in the right hand side of Figure 33.

Figure 28:
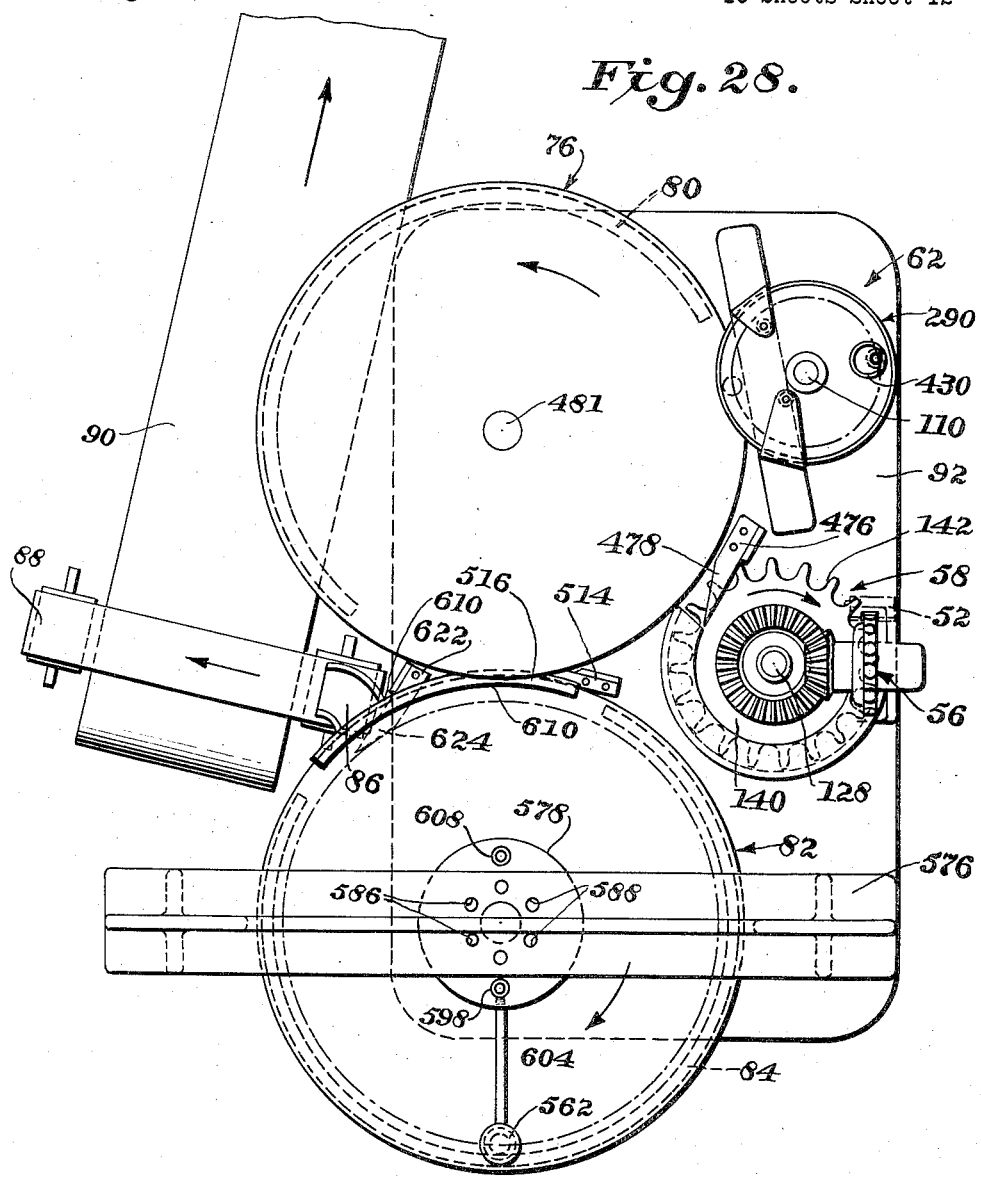
Figure 28 is a view similar to Figure 1 showing a further modification of a machine embodying the principles of the present invention.

Referring now to Figure 28, the lined shells are removed from the molding dial mechanism by means of a guide member 622 suitably mounted in fixed relation on the table 92. The guide member 622 includes a cam surface 624 disposed in the path of movement of the shells so as to transfer the latter from their seats 530 into the stationarily mounted chute 86 which directs the shells onto the transverse conveyor 88. As mentioned above, the shells from transverse conveyor 88 are then suitably transferred therefrom onto a main inspection conveyor 90.

It can thus be seen that there has been provided by the present invention a machine continuously operable to apply liners of a plastic moldable sealing material to the central interior of closures, such as bottle crowns or caps. It will be understood that many plastic materials may be utilized within the scope of the present invention. For example either thermoplastic or a thermosetting plastic may be utilized. The following are illustrations of thermoplastic materials that may be utilized: Polyvinyl chloride, polymethyl methacrylate, polystyrene, polyethylene, polyvinylidene chloride and copolymers and linear polyamides, e. g., polymeric hexamethylene adipamide. The following are illustrations of thermosetting materials that may be utilized: Phenol formaldehyde, urea formaldehyde, melamine formaldehyde, diallyl phthalate and alkyd resins, e. g., glycerol phthalate resins.

The various heating temperatures and molding pressures, as well as the time intervals of their application, will vary in accordance with the materials utilized. Hence, it will be appreciated that the changes necessary to alter the temperatures and pressures applied may be readily made in the machine without extensive revision.

It will also be apparent that many aspects of the present invention readily lend themselves to utilization in machines adapted to form molded articles made entirely of plastic, as for example, plastic screw cap making machines and the like.

Moreover, it is to be understood that the forms of the invention herewith shown and described are to be taken as the preferred embodiments of the same and that various changes may be made without departing from the spirit of the invention or the scope of the appended claims.

We claim:

1. A machine for applying liners of a moldable material to the interior of closures comprising means for supplying measured charges of a granular moldable material, a rotary dial for carrying a series of closures past said charge supplying means, means on said rotary dial for moving the closures thereon between an outwardly disposed charge receiving position when the closures are in proximity to said supplying means so as to receive a charge therefrom and an inwardly disposed molding position, means for heating the charges in said closures, and plunger means carried by said rotary dial operable when said closures are in said molding position to press and mold the charges to shape the same and form liners in said closures.

2. A machine of the character described in claim 1 wherein said charge supplying means comprises a dial plate having a plurality of circumferentially spaced charge measuring pockets extending vertically therethrough, said pockets having open upper and lower ends and being operable during the rotation of said dial plate to receive granular moldable material through their open upper ends at a first position and to deposit a measured charge of said material through their open lower ends into said closures at a second position, means for closing the open lower ends of said pockets when the latter are in said first position, and means for preventing any material from extending above the open upper ends of said pockets when the latter are in said second position.

3. A machine of the character described in claim 1 including means for controlling said plunger means so as to apply an initial relatively low pressure and a final relatively high pressure.

4. A machine of the character described in claim 3 wherein said control means comprises spring means urging said plunger means into engagement with said charges, and latch means arranged to limit the downward movement of the plunger means so as to permit the latter to applying said initial low pressure and releasable to permit the plunger means to apply said final high pressure.

5. A machine of the character described in claim 3 wherein said control means includes spring means for applying said initial pressure and fluid pressure means for applying said final high pressure.

6. In a machine of the character described, means for supplying measured charges of a moldable material, a rotary dial for carrying a series of charge receiving elements past said charge supplying means, means on said rotary dial for moving the charge receiving elements thereon between an outwardly disposed charge receiving position when said elements are in proximity to said supplying means so as to receive a charge therefrom and an inwardly disposed molding position, means for heating the charges in said elements, and plunger means carried by said rotary dial operable when said elements are in said molding position for pressing and molding the charges in said elements.

7. A machine for applying liners of a moldable material to the interior of closures comprising a rotary dial for carrying a series of closures from a closure receiving position to a closure discharging position, a plurality of radially extending slide members carried by said dial and operable between said positions to move closures between a charge receiving position and a molding position, means operable when said closures are in said charge receiving position for depositing a measured charge of a granular moldable material into each of said closures, means for heating the charges in said closures, and plunger means carried by said dial operable when said closures are in said molding position to press and mold the heated charges in said closures to shape the same and form liners in said closures.

8. A machine of the character described in claim 7 wherein said slide members include magnets carried by their outer ends, said magnets being operable to move said closures radially on said dial.

9. In a machine for applying liners to closures comprising, a rotary dial for carrying a series of closures from a closure receiving position to a closure discharging position, a plurality of radially extending slide members carried by said dial and operable between said position for moving said closures between a liner material receiving position and a pressure applying position, means operable when said closures are in said liner material receiving position for depositing a predetermined amount of liner material into each of said closures, and means for securing said liner material in said closures, said last-mentioned means comprising plunger means carried by said dial operable when said closures are in said pressure applying position to press said liner material in said closures.

10. In a machine of the character described, a rotary dial for carrying a series of charge receiving elements, a plurality of radially extending slide members for moving said charge receiving elements between a charge receiving position and a molding position, means operable when said elements are in said charge receiving position for depositing measured charges of a moldable material therein, means for heating the charges in said elements, and plunger means carried by said dial operable when said elements are in said molding position to press and mold the charges in said elements.

11. In a machine of the character described, a first dial rotatable about a vertical axis for carrying a series of charge receiving elements, and a second dial rotatable about a vertical axis spaced from the axis of said first dial for depositing a measured charge of a granular moldable material into said charge receiving elements, said second dial comprising a plurality of circumferentially spaced charge measuring pockets having open upper and lower ends and operable during the rotation of said second dial to receive granular moldable material through their own upper ends at a first position and deposit a measured charge of said material through their open lower ends into said charge receiving elements at a second position, means for closing the open lower ends of said pockets when the latter are in said first position, and means for preventing any material from extending above the open upper ends of said pockets when the latter are in said second position.

12. In a machine for applying liners of a moldable sealing material to the interior of closures, a first dial rotatable about a vertical axis for carrying a series of closures, and a second dial rotatable about a vertical axis spaced from the axis of said first dial for depositing a measured charge of a granular moldable material into said closures, said second dial comprising means defining a plurality of circumferentially spaced charge measuring pockets having open upper and lower ends and operable during the rotation of said second dial to receive granular moldable material through their open upper ends at a first position and deposit a measured charge of said material through their open lower ends into said closures at a second position, means for closing the open lower ends of said pockets when the latter are in said first position, and means for preventing any material from extending above the open upper ends of said pockets when the latter are in said second position.

13. In a machine for applying liners of a moldable sealing material to the interior of closures, a first dial rotatable about a vertical axis for carrying a series of closures, and a second dial rotatable about a vertical axis spaced from the axis of said first dial for depositing a measured charge of a granular moldable material into said closures, said second dial comprising a dial plate having a plurality of circumferentially spaced charge measuring pockets extending vertically therethrough, said pockets having open upper and lower ends and being operable during the rotation of said dial plate to receive granular moldable material through their open upper ends at a first position and to deposit a measured charge of said material through their open lower ends into said charge receiving elements at a second position, pivoted upper and lower gate valves for each of said pockets resiliently biased into engagement with the adjacent surface of said plate, means operable to pivot said lower gate valves into a lower pocket end covering position, cam means for pivoting said lower gate valves into a lower pocket end opening position when said pockets move into said second position, and means for pivoting the upper gate valves into opening and closing relation to the upper end of said pockets during the rotation of said dial plate whereby the upper gate valves are open when the associated pockets are in said first position and closed when the associated pockets are in said second position.

14. A machine of the character described in claim 13 wherein said first dial includes a plurality of radially extending slide members operable to move said closures on said dial between a charge receiving position and a molding position and plunger means operable when said closures are in said molding position to press and mold the charges therein to shape the same and form liners in said closures.

References Cited in the file of this patent

UNITED STATES PATENTS

| | | |
|---|---|---|
| 2,127,994 | Davis et al. | Aug. 23, 1938 |
| 2,155,316 | Lauterback | Apr. 18, 1939 |
| 2,287,356 | Newman | Jan. 23, 1942 |
| 2,581,898 | Alexander et al. | Jan. 2, 1952 |
| 2,657,426 | Gora | Nov. 3, 1953 |
| 2,663,908 | Maier et al. | Dec. 29, 1953 |
| 2,663,909 | Maier et al. | Dec. 29, 1953 |
| 2,684,774 | Aichele | July 27, 1954 |
| 2,745,135 | Gora | May 15, 1956 |